US008385263B2

(12) United States Patent
Hirano et al.

(10) Patent No.: US 8,385,263 B2
(45) Date of Patent: Feb. 26, 2013

(54) COMMUNICATION SYSTEM, DOMAIN MANAGING DEVICE, EDGE DEVICE AND MOBILE TERMINAL DEVICE

(75) Inventors: Jun Hirano, Kanagawa (JP); Takashi Aramaki, Osaka (JP); Chun Keong Benjamin Lim, Singapore (SG); Chan Wah Ng, Singapore (SG); Tien Ming Benjamin Koh, Singapore (SG); Pek Yew Tan, Singapore (SG)

(73) Assignee: Panasonic Corporation, Osaka (JP)

( * ) Notice: Subject to any disclaimer, the term of this patent is extended or adjusted under 35 U.S.C. 154(b) by 840 days.

(21) Appl. No.: 12/521,519

(22) PCT Filed: Dec. 19, 2007

(86) PCT No.: PCT/JP2007/074468
§ 371 (c)(1),
(2), (4) Date: Jun. 26, 2009

(87) PCT Pub. No.: WO2008/078633
PCT Pub. Date: Jul. 3, 2008

(65) Prior Publication Data
US 2010/0315973 A1 Dec. 16, 2010

(30) Foreign Application Priority Data

Dec. 27, 2006 (JP) ................. 2006-352284
Oct. 16, 2007 (JP) ................. 2007-268584

(51) Int. Cl.
*H04W 4/00* (2009.01)
(52) U.S. Cl. .................. 370/328; 370/254; 370/395.31; 370/419

(58) Field of Classification Search ........................ None
See application file for complete search history.

(56) References Cited

U.S. PATENT DOCUMENTS

| 7,236,470 | B1 | 6/2007 | Bims |
| 2004/0100922 | A1 | 5/2004 | Yegin |
| 2005/0271032 | A1 | 12/2005 | Yun |
| 2006/0002344 | A1* | 1/2006 | Ono et al. ..................... 370/331 |
| 2008/0256220 | A1* | 10/2008 | Bachmann et al. ............ 709/222 |

FOREIGN PATENT DOCUMENTS

WO 2004/105272 12/2004

OTHER PUBLICATIONS

Levkowetz et al.,"The NetLMM Protocol", draft-giaretta-netlmm-dt-protocol-02, Oct. 2006, The Internet Society.*
Levkowetz et al., "The NetLMM Protocol, draft-giaretta-netlmm-dt-protocol-02", Oct. 5, 2006, ietf.*
International Search Report dated Feb. 12, 2008.

(Continued)

*Primary Examiner* — Jae Y Lee
(74) *Attorney, Agent, or Firm* — Dickinson Wright PLLC

(57) ABSTRACT

A technique disclosed enables a node having a plurality of interfaces to conduct connection of the plurality of interfaces simultaneously in a communication network domain. A mobile node having a plurality of interfaces connects one of the interfaces with a MAG (mobile access gateway) 11a to take part in a NetLMM domain 18 using a NetLMM protocol, and a LMA (local mobility anchor) 13 includes association information with the MAG 11a registered therein. When the mobile node connects another interface with another MAG 11b, the LMA receives a registration request for association information of this mobile node with the MAG 11b, and makes an inquiry to the already registered MAG 11a as to whether link with the mobile node is still valid or not. If the link is valid, the LMA keeps association information of the mobile node with both of the MAGs 11a and 11b.

12 Claims, 8 Drawing Sheets

OTHER PUBLICATIONS

H. Levkowetz, et al., "The NetLMM Protocol," IETF Internet-Draft, Oct. 5, 2006, pp. 1-60, p. 6, Line 22.

K. Aso, et al., "Proposal on MobileIPv6 extension for using multiple interfaces by mobile node," IEICE Technical Report IN2006-21, Jun. 2006, pp. 25-30.

G. Motoyoshi, et al, "Expandability evaluation of NETLMM," Proceedings of the 2006 IEICE Communications Society Conference, B-6-32, Sep. 2006, pp. 32, with English Translation.

D. Johnson, et al., "Mobility Support in IPv6," IETF RFC 3775, Jun. 2004, pp. 1-165, p. 6, Line 26.

R. Wakikawa, et al., "Multiple Care-of Addresses Registration," IETF Internet-Draft, Jun. 2006, pp. 1-36, p. 6, Line 28.

S. Gundavelli, et al., "Proxy Mobile IPv6," IETF Internet-Draft, Apr. 2007, pp. 1-46, p. 6, Line 31.

* cited by examiner

COMMUNICATION SYSTEM, DOMAIN MANAGING DEVICE, EDGE DEVICE AND MOBILE TERMINAL DEVICE

TECHNICAL FIELD

The present invention relates to a communication system, a domain managing device, an edge device, and a mobile terminal in a packet-exchange type data communication network such as an IP (Internet Protocol) network.

BACKGROUND ART

IP mobility enables a mobile device to keep reachablity in the Internet using a home address (HoA), while moving from one network to another network. As a protocol implementing this IP mobility, the IETF (Internet Engineering Task Force) is currently configuring a standardization protocol called mobile IP. The mobile IP is a communication protocol having excellent performance and extensibility for mobility of a node in the Internet.

The mobile IP allows a node to change a connection point to the Internet without changing the IP address (home address), thus enabling the node to keep a connection to a transport layer or a higher-order layer while moving. Herein, the implementation of the node mobility does not require configuring a route specific to the host over the routing configuration of the Internet as a whole. For example, a typical scenario to be considered to use the mobile IP is in the wireless WAN (Wide Area Network) environment. In the wireless WAN environment, a mobile device may pass through a plurality of LANs (Local Area Network) having different addresses. The mobile IP may be used to give transparency when a communication device of a user in communication with the Internet moves between cellular base stations in the third-generation (3G) network. Currently, the mobile IP of IP version (IPv4) or of IP version (IPv6) is available.

Recently, support for local IP mobility is also being provided. The local IP mobility is IP mobility in a network topology (connection condition of a network) of a limited area. Even when the area of the network topology for the mobile node to move is limited, the actual geographical area may be relatively wide. This depends on mapping between the network topology and a radio communication area. As an executable scenario for local mobility, an example may include the arrangement of wireless LAN environment in a large-scale campus (e.g., university campus). A user located in the campus area can receive services such as e-mail, search, or Web-surfing while moving in the university campus. However, it is not said as good expansion that all WLAN access points in the campus area are accommodated in a single broadcast domain.

Due to some reasons (e.g., the link does not conform to IEEE802.3), a single VLAN (Virtual Local Area Network) cannot cover a part of the campus in some cases. In this case, it is desirable that the campus is divided into links of last-hop each provided by one more access routers. Thus, in order to have an invariant IP address usable in each area (the respective areas provided by the access routers) in the university campus, it is required to use a certain localized mobility management technique. NetLMM (Network-based Localized Mobility Management) is a working group in the IETF designing a protocol for network-based localized mobility. The following Non-Patent Document 1 introduces a localized mobility management protocol to conduct IP mobility management that is limited within an access network (or called a NetLMM domain). This protocol accommodates a change of the access network due to moving, thus localizing the moving.

When a mobile node connects with a NetLMM infrastructure, the mobile node first has to use a stateful address configuration processing or a stateless address configuration processing to configure an address with a LMA (Local Mobility Anchor) that is providing a service. Therefore, when the mobile node connects with a MAG (Mobile Access Gateway), the MAG sends, to the LMA, a location registration message including information of its own (ID) and an ID of the mobile node. The LMA responds to this message using a location registration confirmation message including a NetLMM prefix usable for router notification from the MAG to the mobile node. Then, the MAG sends a router notification (including the NetLMM prefix) to the mobile node connected therewith. When address configuration is completed, the MAG sends, to the LMA, a MN address setup message including the ID of the MAG, the ID of the MN, the address of the NetLMM, and the ID of a tunnel, thus registering the address of the mobile node at the LMA. The LMA creates a transfer state with respect of a packet to this message, and sends, to the MAG, a MN address reply message approving the packet setup. When receiving a MN address setup reply message indicating the approval, the MAG creates a transfer state concerning a packet addressed to the mobile node.

Recently, laptop and other hand-held electronic peripheral devices are being manufactured with a plurality of network interfaces. Meanwhile, as for mobile IPv6 (MIPv6) described in the following Non-Patent Document 2, a mobile node can associate a care-of address (CoA) of its own with a home address (HoA) at a home agent so that reachability can be realized even when the mobile node is away from a home network. Thus, for hand-held electronic peripheral equipment with several network interfaces, the mobile node can register a plurality of care-of addresses to a predetermined home address.

Currently the IETF working group for Mobile Nodes and Multiple Interfaces in IPv6 (Monami6) defines such a method of registering a plurality of care-of addresses. In order to identify a plurality of bindings for one HoA, the following Non-Patent Document 3 introduces an identification number called a binding unique identification number (BID). The BID is assigned to an interface or a CoA associated with one home address (HoA) of the mobile node. Thus, the HoA is associated with the mobile node, whereas the BID specifies each binding registered by the mobile node. The mobile node notifies the home agent of the BID by binding update (BU), and the home agent records the BID in a binding cache of its own.

Herein, assume that a mobile node having a plurality of interfaces tries to have simultaneous connection (or simultaneous association) with a single LMA in a NetLMM domain. Herein the simultaneous connection refers to the state where a node (multi mode node) having a plurality of interfaces connects with each of the plurality of interfaces simultaneously. When the mobile node having a plurality of interfaces connects with the same LMA via different MAGs using the ID of the MN, location registration messages sent from the MAGs to the LMA are nullified mutually (i.e., overwritten). Thereby, the LMA actually uses only one interface of the mobile mode in any case.

Herein, the following Patent Document 1 discloses a method of allowing a mobile node (mobile station) having a plurality of interfaces to use one global address at any one of the plurality of interfaces. The mobile station creates a link local IP address usable to local communication at any one of the plurality of interfaces. Then, the mobile station uses the link local IP address to obtain, from a global obtaining unit, one global address usable to global communication through all of the plurality of interfaces. Thus, there is no need for the mobile station to create a global address for each of the plurality of interfaces.

The following Patent Document 2 discloses a method of associating a plurality of link layer addresses with an IP address in a radio communication network. This method allows a client device to aggregate data links associated with the IP address, thus increasing the download capacity of data. This method further enables bi-casting of data to the client device from the IP address associated with the plurality of link layer addresses of a radio communication device. This method still further enables failure recovery when a communication link to a first link layer address becomes deteriorated by allowing downloading to a second link layer address.

Further, the NetLMM working group recently discusses adoption of a local mobility management protocol of another type. This protocol is called a proxy-mobile IP (PMIP: Proxy MIP), described by the following Non-Patent Document 4, for example.

The PMIP uses extended mobile IPv6 signaling as a signaling message between a MAG and a LMA. When a mobile node moves in a NetLMM domain, the mobile node presents an ID of the mobile node in an access approving processing, thus connecting with the MAG. The ID the MN is normally used to associate a policy profile of the mobile node that can be obtained from a local server.

The policy profile includes a feature of a network-base mobility service provided, parameters related (e.g., a prefix assigned to the mobile node, an address configuration mode permitted, and roaming policy), and parameters required to provide other network-base mobility services, for example.

When succeeding in access approval, the MAG obtains a policy profile of the mobile node from a local server. Thereby, the MAG can have all information required to execute mobility signaling related to the mobile node. Then, the MAG periodically sends, to the mobile node, a router advertisement (RA) message to make a notification of a prefix assigned to the mobile node.

When finding a prefix from the received RA message, the mobile node configures an IP address (e.g., a home address in a home domain, and a care-of address in an external domain) so as to conduct communication at an interface connected with the NetLMM domain. As long as the mobile node moves in the NetLMM domain, the interface connected with the NetLMM domain can always find the same prefix. This can be implemented by having each MAG connected with the mobile node to always obtain a profile of the mobile mode from the local server. Thus, the mobile node can always use the first configured IP address to conduct communication irrespective of the location in the NetLMM domain. As another method of configuring an address, a stateful address configuration method such as DHCP may be used to assign an address or a prefix to the mobile node.

As stated above, the LMA functions as a logical (topological) anchor point for each mobile node in the NetLMM domain. In order to function as the anchoring point for each mobile node, the LMA is required to update the current location of each mobile node. To this end, every time the mobile node connects with a MAG, the MAG sends, to the LMA, a proxy binding update (PBU) message. This PBU message binds a unique identifier of the mobile node to a care-of address (a unique identifier) of the MAG. This binding allows the LMA to send a packet to the mobile node via an appropriate MAG.

A mobile node having a plurality of interfaces that is located in a NetLMM domain does not always mean that all of the interfaces have to connect with the NetLMM domain. For instance, assume that the mobile node has a cellular interface and a WLAN interface, and a user of the mobile node makes a contract (usage contract) with a service provider for cellular services. Meanwhile, assume that the service provider has a WLAN access point in the NetLMM domain, and provides WLAN services as well. In this case, depending on the contents of the usage contract, the WLAN interface of the mobile node may not be permitted to access the WLAN access point of the service provider even during moving in the NetLMM domain.

The following Non-Patent Document 3 discloses a typical exemplary method of controlling access of a mobile node having a plurality of interfaces. The conventional technique disclosed in Non-Patent Document 3 specifies an interface of the mobile node using a unique identifier (e.g., media access control (MAC) address). Information such as a unique identifier of an interface used for connection, for example, is stored in an access control list existing in a network.

In the case where an interface of the mobile node tries to connect with the network via a switch, the switch uses the access control list to judge whether the mobile node has already connected with the network via another interface or not. If the mobile node has already connected with the network via another interface, the switch uses a policy related to the mobile node to confirm whether it is possible or not for the mobile node to conduct simultaneous connection with the network. If it is judged that the mobile node is incapable of conducting simultaneous connection based on the policy, the switch refuses access of the mobile node to the second interface.

Patent Document 1: United States Patent Application Publication No. 2005/0271032
Patent Document 2: United States Patent Application Publication No. 2004/0100922
Patent Document 3: U.S. Pat. No. 7,236,470
Non-Patent Document 1: G. Giaretta, K. Leung, M. Liebsch, P. Roberts, K. Nishida, H. Yokota, M. Parthasarathy and H. Levkowetz, "The NetLMM Protocol", NetLMM Working Group Internet-Draft, Internet-Draft, draft-giaretta-netlmm-dt-protocol-02.txt, Oct. 5, 2006.
Non-Patent Document 2: D. Johnson, C. Perkins and J. Arkko, "Mobility Support in IPv6", Internet Engineering Task Force Request For Comments 3775, June 2004.
Non-Patent Document 3: R. Wakikawa, T. Ernst and K. Nagami, "Multiple Care-of Addresses Registration", Monami6 Working Group Internet-Draft, draft-ieff-monami6-multiplecoa-00.txt, Jun. 12, 2006.
Non-Patent Document 4: S. Gundavelli, K. Leung, V. Devarapalli, K. Chowdhury and B. Patil, "Proxy Mobile IPv6", Internet Engineering Task Force Internet Draft: draft-ieff-netlmm-proxymip6-00.txt, Apr. 8, 2007.

According to the technique disclosed in Patent Document 1, another interface of a mobile station (an interface different from the interface that creates the link local IP address) is not required to create a link local IP address and can use a global address for global communication immediately. However, there is a problem that there is a limit for the mobile station to use only one of the plurality of interfaces at a time. The technique disclosed in Patent Document 2 does not describe a method of associating a plurality of link layer addresses with an IP address in detail.

DISCLOSURE OF THE INVENTION

To cope with the above-stated problems, it is an object of the present invention to provide a communication system, a domain managing device, an edge device, and a mobile terminal so as to enable a node having a plurality of interfaces to conduct connection of the plurality of interfaces simultaneously in a communication network domain (especially in a NetLMM domain).

To fulfill the above-stated object, a communication system of the present invention is adapted to conduct a protocol operation to implement local mobility of a mobile terminal having a plurality of interfaces on a network side, and includes a mobility management domain formed therein. The communication system includes: a plurality of edge devices disposed at an edge on a terminal side of an access network of the mobility management domain, with which the mobile terminal is connectable; and a domain managing device that manages a packet transfer path to the mobile terminal that connects with the mobility management domain, and keeps association information that associates the mobile terminal with the edge device with which the mobile terminal currently connects. When the domain managing device receives from a first edge device a message notifying that the mobile terminal tries to connect with the first edge device, the domain managing device refers to the association information kept therein to check whether the association information includes association information of the mobile terminal that tries to the first edge device. If the association information of the mobile terminal is included, the domain managing device makes an inquiry to a second edge device associated by the association information of the mobile terminal to inquire whether connection with the mobile terminal is valid or not. If the connection with the mobile terminal is valid, the domain managing device keeps association information that associates the mobile terminal with both of the first edge device and the second edge device. On the other hand, if the connection with the mobile terminal is not valid, the association information associating the mobile terminal with the second edge device is deleted, while keeping association information associating the mobile terminal with the first edge device.

With this configuration, a node having a plurality of interfaces becomes capable of conducting connection of the plurality of interfaces simultaneously in a communication network domain (especially in a NetLMM domain). Further with this configuration, a configuration and an operation in the first embodiment of the present invention described later can be implemented.

To fulfill the above-stated object, a communication system of the present invention is adapted to conduct a protocol operation to implement local mobility of a mobile terminal having a plurality of interfaces on a network side, and includes a mobility management domain formed therein. The communication system includes: a plurality of edge devices disposed at an edge on a terminal side of an access network of the mobility management domain, with which the mobile terminal is connectable; and a domain managing device that manages a packet transfer path to the mobile terminal that connects with the mobility management domain, and keeps association information that associates the interface of the mobile terminal with the edge device with which the interface currently connects. When the domain managing device receives from a first edge device a message notifying that a first interface of the mobile terminal tries to connect with the first edge device, the domain managing device refers to the association information kept therein to check whether the association information includes association information of the mobile terminal that tries to the first edge device. If association information associating a second edge device different from the first edge device with the first interface is included, the domain managing device deletes the association information associating the second edge device with the first interface, while keeping association information of the first edge device with the first interface. If association information associating the second edge device with a second interface different from the first interface is included, the domain managing device keeps the association information associating the first edge device with the first interface in addition to the association information associating the second edge device with the second interface as association information common to the mobile terminal.

With this configuration, a node having a plurality of interfaces becomes capable of conducting connection of the plurality of interfaces simultaneously in a communication network domain (especially in a NetLMM domain). Further with this configuration, a configuration and an operation to identify a connection in units of interfaces in the first embodiment of the present invention described later can be implemented.

To fulfill the above-stated object, a communication system of the present invention is adapted to conduct a protocol operation to implement local mobility of a mobile terminal having a plurality of interfaces on a network side, and includes a mobility management domain formed therein. The communication system includes: a plurality of edge devices disposed at an edge on a terminal side of an access network of the mobility management domain, with which the mobile terminal is connectable; and a plurality of domain managing devices that manage a packet transfer path to the mobile terminal that connects with the mobility management domain, and keep association information that associates the mobile terminal with the edge device with which the mobile terminal currently connects. When one of the plurality of domain managing devices receives from a first edge device a message notifying that the mobile terminal tries to connect with the first edge device, and if the domain managing device itself does not keep association information on the mobile terminal that tries to connect with the first edge device, the domain managing device makes an inquiry to another domain managing device of the plurality of domain managing devices whether the other domain managing device keeps association information on the mobile terminal that tries to connect with the first edge device. If the domain managing device receives a notification as a result of the inquiry that any other one of the domain managing devices keeps association information associating the mobile terminal with a second edge device different from the first edge device, the domain managing device keeps association information that associates the mobile terminal with both of the first edge device and the second edge device.

With this configuration, a node having a plurality of interfaces becomes capable of conducting connection of the plurality of interfaces simultaneously in a communication network domain (especially in a NetLMM domain). Further with this configuration, a configuration and an operation in the second embodiment of the present invention described later can be implemented.

To fulfill the above-stated object, a communication system of the present invention is adapted to conduct a protocol operation to implement local mobility of a mobile terminal having a plurality of interfaces on a network side, and includes a mobility management domain formed therein. The communication system includes: a plurality of edge devices disposed at an edge on a terminal side of an access network of the mobility management domain, with which the mobile terminal is connectable; and a plurality of domain managing devices that manage a packet transfer path to the mobile terminal that connects with the mobility management domain, and keep association information that associates the interface of the mobile terminal with the edge device with which the interfaces currently connect. When one of the plurality of domain managing devices receives from a first edge device a message notifying that a first interface of the mobile terminal tries to connect with the first edge device, and if the domain managing device itself does not keep the association information on the first interface of the mobile terminal that tries to connect with the first edge device, the domain managing device makes an inquiry to another domain managing device of the plurality of domain managing devices whether the other domain managing device keeps the association information on the first interface of the mobile terminal that tries to connect with the first edge device. If the domain managing device receives a notification from any other one of the domain managing devices as a result of the inquiry that association information associating a second interface different from the first interface with a second edge device different from the first edge device is included, the domain managing device keeps the association information that associates the second interface with the second edge device in addition to the association information that associates the first interface with the first edge device as association information common to the mobile terminal.

With this configuration, a node having a plurality of interfaces becomes capable of conducting connection of the plurality of interfaces simultaneously in a communication network domain (especially in a NetLMM domain). Further with this configuration, a configuration and an operation to identify a connection in units of interfaces in the second embodiment of the present invention described later can be implemented.

To fulfill the above-stated object, a communication system of the present invention is adapted to conduct a protocol operation to implement local mobility of a mobile terminal having a plurality of interfaces on a network side, and includes a mobility management domain formed therein. The communication system includes: a plurality of edge devices disposed at an edge on a terminal side of an access network of the mobility management domain, with which the mobile terminal is connectable; and a plurality of domain managing devices that manage a packet transfer path to the mobile terminal that connects with the mobility management domain, and keep association information that associates the mobile terminal with the edge device and the domain managing devices that manage the edge devices. When a first domain managing device as one of the plurality of domain managing devices receives from a first edge device a message notifying that the mobile terminal tries to connect with the first edge device, the first domain managing device refers to the association information kept in the first domain managing device to check whether the association information includes association information of the mobile terminal that tries to the first edge device. If the association information of the mobile terminal is not included, the first domain managing device keeps association information associating the mobile terminal with the first edge device and the first domain managing device, while making other domain managing devices of the plurality of domain managing devices conduct a similar updating processing. On the other hand, if the association information of the mobile terminal is included, the first domain managing device makes an inquiry to a second domain managing device that manages a second edge device associated using the association information of the mobile terminal to inquire whether connection with the mobile terminal is valid or not. As a result of the inquiry, if the connection with the mobile terminal is valid, the first domain managing device keeps the association information that associates the mobile terminal with the first edge device and the first domain managing device and the association information that associates the mobile terminal with the second edge device and the second domain managing device, while making other domain managing devices of the plurality of domain managing devices conduct a similar updating processing. On the other hand, as a result of the inquiry, if the connection with the mobile terminal is not valid, the first domain managing device deletes the association information associating the mobile terminal with the second edge device and the second domain managing device, while keeping the association information associating the mobile terminal with the first edge device and the first domain managing device, and further making other domain managing devices of the plurality of domain managing devices conduct a similar updating processing.

With this configuration, a node having a plurality of interfaces becomes capable of conducting connection of the plurality of interfaces simultaneously in a communication network domain (especially in a NetLMM domain). Further with this configuration, a configuration and an operation in the third embodiment of the present invention described later can be implemented.

To fulfill the above-stated object, a communication system of the present invention is adapted to conduct a protocol operation to implement local mobility of a mobile terminal having a plurality of interfaces on a network side, and includes a mobility management domain formed therein. The communication system includes: a plurality of edge devices disposed at an edge on a terminal side of an access network of the mobility management domain, with which the mobile terminal is connectable; and a plurality of domain managing devices that manage a packet transfer path to the mobile terminal that connects with the mobility management domain, and keep association information that associates the interfaces of the mobile terminal with the edge device that the interface currently connects and the domain managing device that manages the edge device. When a first domain managing device as one of the plurality of domain managing devices receives from a first edge device a message notifying that a first interface of the mobile terminal tries to connect with the first edge device, the first domain managing device refers to the association information kept in the first domain managing device to check whether the association information includes association information of the first interface of the mobile terminal that tries to the first edge device. If the association information of the first interface is not included, the first domain managing device keeps association information associating the first interface with the first edge device and the first domain managing device, while making other domain managing devices of the plurality of domain managing devices conduct a similar updating processing. On the other hand, if the association information of the first interface is included, the first domain managing device makes an inquiry to a second domain managing device that manages a second edge device associated using the association information of the first interface to inquire whether connection of the mobile terminal with the first interface is valid or not. As a result of the inquiry, if the connection with the first interface is valid, the first domain managing device keeps association information that associates the second interface with the second edge device and the second domain managing device in addition to the association information that associates the first interface with the first edge device and the first domain managing device as association information common to the mobile terminal, while making other domain managing devices of the plurality of domain managing devices conduct a similar updating processing. On the other hand, as a result of the inquiry, if the connection with the first interface is not valid, the first domain managing device deletes the association information associating the second interface with the second edge device and the second domain managing device is deleted, while keeping the association information associating the first interface with the first edge device and the first domain managing device, and further making other domain managing devices of the plurality of domain managing devices conduct a similar updating processing.

With this configuration, a node having a plurality of interfaces becomes capable of conducting connection of the plurality of interfaces simultaneously in a communication network domain (especially in a NetLMM domain). Further with this configuration, a configuration and an operation to identify a connection in units of interfaces in the third embodiment of the present invention described later can be implemented.

The communication system of the present invention further may include one or a plurality of policy servers that manage a filter for filtering a flow of the mobile terminal that is transferred in the access network.

With this configuration, filters for flow filtering of the mobile terminal can be managed using a centralized policy server or a distributed policy server.

In the above communication system of the present invention, the domain managing device may refer to policy of the mobile terminal and manage the association information.

This configuration enables registration of binding information and access control in accordance with policy corresponding to each mobile terminal.

In the above communication system of the present invention, when the mobile terminal uses a single interface, the domain managing device does not make an inquiry as to whether the mobile terminal tries to conduct simultaneous connection of the plurality of interfaces or not.

This configuration allows the domain managing device to judge promptly the case where an unnecessary inquiry (or a redundant inquiry) can be omitted.

In the above communication system of the present invention, when the policy of the mobile terminal specifies any one of that the mobile terminal does not conduct simultaneous connection of the plurality of interfaces, the mobile terminal has a single interface only, and only one of the plurality of interfaces is used, the domain managing device judges that the mobile terminal uses a single interface.

This configuration allows the domain managing device to judge promptly the case where an unnecessary inquiry (or a redundant inquiry) can be omitted.

The above communication system of the present invention further includes a policy server that manages policy of the mobile terminal.

This configuration allows policy of the mobile terminal to be managed on a network side.

In the above communication system of the present invention, PMIP is used as the protocol that implements the local mobility of the mobile terminal on the network side.

This configuration allows the present invention to be applied to a network deploying PMIP.

To fulfill the above-stated object, a domain managing device of the present invention is adapted to conduct a protocol operation to implement local mobility of a mobile terminal having a plurality of interfaces on a network side, and can be disposed in a communication system including a mobility management domain formed therein, the domain managing device managing a packet transfer path to the mobile terminal that connects with the mobility management domain, and keeping association information that associates the mobile terminal with an edge device with which the mobile terminal currently connects, the edge device being disposed at an edge on a terminal side of an access network of the mobility management domain. The domain managing device includes: reception means that receives from a first edge device a message notifying that the mobile terminal tries to connect with the first edge device; association information keeping means that keeps the association information; check means that, when the reception means receives the message, refers to the association information kept by the association information keeping means so as to check whether the association information includes association information of the mobile terminal that tries to connect with the first edge device or not; inquiry means that, if the check means understands that the association information of the mobile terminal is included, makes an inquiry to a second edge device associated using the association information of the mobile terminal to inquire whether connection with the mobile terminal is valid or not; and information keeping control means that, if it is judged as a result of the inquiry by the inquiry means that the connection with the mobile terminal is valid, makes the association information keeping means keep association information associating the mobile terminal with both of the first and the second edge devices, and if it is judged the connection with the mobile terminal is not valid, deletes association information associating the mobile terminal with the second edge device from the association information keeping means, while making the association information keeping means keep association information associating the mobile terminal with the first edge device.

With this configuration, a node having a plurality of interfaces becomes capable of conducting connection of the plurality of interfaces simultaneously in a communication network domain (especially in a NetLMM domain). Further with this configuration, a configuration and an operation in the first embodiment of the present invention described later can be implemented.

To fulfill the above-stated object, a domain managing device of the present invention is adapted to conduct a protocol operation to implement local mobility of a mobile terminal having a plurality of interfaces on a network side, and can be disposed in a communication system including a mobility management domain formed therein, the domain managing device managing a packet transfer path to the mobile terminal that connects with the mobility management domain, and keeping association information that associates interfaces of the mobile terminal with an edge device with which the interfaces currently connect, the edge device being disposed at an edge on a terminal side of an access network of the mobility management domain. The domain managing device includes: reception means that receives from a first edge device a message notifying that a first interface of the mobile terminal tries to connect with the first edge device; association information keeping means that keeps the association information; check means that, when the reception means receives the message, refers to the association information kept by the association information keeping means so as to check whether the association information includes association information of the mobile terminal that tries to connect with the first edge device or not; and information keeping control means that, if the check means understands that association information that associates the first interface with a second edge device different from the first edge device is included, deletes association information associating the first interface with the second edge device from the association information keeping means, while making the association information keeping means keep association information associating the first interface with the first edge device, and if the check means understands that association information that associates a second interface different from the first interface with the second edge device is included, makes the association information keeping means keep the association information associating the first edge device with the first interface in addition to the association information associating the second edge device with the second interface as association information common to the mobile terminal.

With this configuration, a node having a plurality of interfaces becomes capable of conducting connection of the plurality of interfaces simultaneously in a communication network domain (especially in a NetLMM domain). Further with this configuration, a configuration and an operation to identify a connection in units of interfaces in the first embodiment of the present invention described later can be implemented.

To fulfill the above-stated object, a domain managing device of the present invention is adapted to conduct a protocol operation to implement local mobility of a mobile terminal having a plurality of interfaces on a network side, and can be disposed in a communication system including a mobility management domain formed therein, the domain managing device managing a packet transfer path to the mobile terminal that connects with the mobility management domain, and keeping association information that associates the interface of mobile terminal with edge device with which the interface currently connects, the edge device being disposed at an edge on a terminal side of an access network of the mobility management domain. The domain managing device includes: reception means that receives from a first edge device a message notifying that the mobile terminal tries to connect with the first edge device; association information keeping means that keeps the association information; check means that, when the reception means receives the message, refers to the association information kept by the association information keeping means so as to check whether the association information includes association information of the mobile terminal that tries to connect with the first edge device or not; inquiry means that, if the check means understands that the association information of the mobile terminal that tries to connect with the first edge device is not included, makes an inquiry to another domain managing device to inquire whether association information of the mobile terminal that tries to connect with the first edge device is kept or not; and information keeping control means that, if receiving a notification from any other domain managing device as a result of the inquiry, notifying that association information associating with the mobile terminal with a second edge device different from the first edge device is kept, makes the association information keeping means keep association information associating the mobile terminal with both of the first and the second edge devices.

With this configuration, a node having a plurality of interfaces becomes capable of conducting connection of the plurality of interfaces simultaneously in a communication network domain (especially in a NetLMM domain). Further with this configuration, a configuration and an operation in the second embodiment of the present invention described later can be implemented.

To fulfill the above-stated object, a domain managing device of the present invention is adapted to conduct a protocol operation to implement local mobility of a mobile terminal having a plurality of interfaces on a network side, and can be disposed in a communication system including a mobility management domain formed therein, the domain managing device managing a packet transfer path to the mobile terminal that connects with the mobility management domain, and keeping association information that associates the interface of mobile terminal with edge device with which the interface currently connects, the edge device being disposed at an edge on a terminal side of an access network of the mobility management domain. The domain managing device includes: reception means that receives from a first edge device a message notifying that a first interface of the mobile terminal tries to connect with the first edge device; association information keeping means that keeps the association information; check means that, when the reception means receives the message, refers to the association information kept by the association information keeping means so as to check whether the association information includes association information of the first interface or not; inquiry means that, if the check means understands that the domain managing device itself does not keep the association information of the first interface of the mobile terminal that tries to connect with the first edge device, makes an inquiry to another domain managing device to inquire whether association information of the first interface of the mobile terminal that tries to connect with the first edge device is kept or not; and information keeping control means that, if receiving a notification from any other domain managing device as a result of the inquiry, notifying that association information associating with a second interface different from the first interface with a second edge device different from the first edge device is kept, makes the association information keeping means the keep association information associating the second edge device with the second interface in addition to the association information associating the first edge device with the first interface as association information common to the mobile terminal.

With this configuration, a node having a plurality of interfaces becomes capable of conducting connection of the plurality of interfaces simultaneously in a communication network domain (especially in a NetLMM domain). Further with this configuration, a configuration and an operation to identify a connection in units of interfaces in the second embodiment of the present invention described later can be implemented.

To fulfill the above-stated object, a domain managing device of the present invention is adapted to conduct a protocol operation to implement local mobility of a mobile terminal having a plurality of interfaces on a network side, and can be disposed in a communication system including a mobility management domain formed therein, the domain managing device managing a packet transfer path to the mobile terminal that connects with the mobility management domain, and keeping association information that associates the interface of mobile terminal with edge device with which the interface currently connects and the domain managing device managing the edge device, the edge device being disposed at an edge on a terminal side of an access network of the mobility management domain. The domain managing device includes: reception means that receives from a first edge device a message notifying that the mobile terminal tries to connect with the first edge device; association information keeping means that keeps the association information; update instruction means that, when the association information kept by the association information keeping means is updated, instructs another domain managing device to update information similarly; check means that, when the reception means receives the message, refers to the association information kept by the association information keeping means so as to check whether the association information includes association information of the mobile terminal that tries to connect with the first edge device or not; first information keeping control means that, if the check means understands that the association information of the mobile terminal is not kept, makes the association information keeping means keep association information associating the mobile terminal with the first edge device and a first domain managing device, while making the update instruction means instruct another domain managing device to update information similarly; inquiry means that, if the check means understands that the association information of the mobile terminal is kept, makes an inquiry to a second domain managing device that manages a second edge device associated using association information of the mobile terminal inquiring whether connection with the mobile terminal is valid or not; and second information keeping control means that, as a result of the inquiry by the inquiry means, if the connection with the mobile terminal is valid, makes the association information keeping means keep the association information that associates the mobile terminal with the first edge device and the first domain managing device and association information that associates the mobile terminal with the second edge device and the second domain managing device, while making another domain managing device update information similarly, on the other hand, as a result of the inquiry by the inquiry means, if the connection with the mobile terminal is not valid, deletes the association information associating the mobile terminal with the second edge device and the second domain managing device, while keeping the association information associating the mobile terminal with the first edge device and the first domain managing device, and further making the other domain managing devices update information similarly.

With this configuration, a node having a plurality of interfaces becomes capable of conducting connection of the plurality of interfaces simultaneously in a communication network domain (especially in a NetLMM domain). Further with this configuration, a configuration and an operation in the third embodiment of the present invention described later can be implemented.

To fulfill the above-stated object, a domain managing device of the present invention is adapted to conduct a protocol operation to implement local mobility of a mobile terminal having a plurality of interfaces on a network side, and can be disposed in a communication system including a mobility management domain formed therein, the domain managing device managing a packet transfer path to the mobile terminal that connects with the mobility management domain, and keeping association information that associates the interface of mobile terminal with edge device with which the interface currently connects and the domain managing device managing the edge device, the edge device being disposed at an edge on a terminal side of an access network of the mobility management domain. The domain managing device includes: reception means that receives from a first edge device a message notifying that a first interface of the mobile terminal tries to connect with the first edge device; association information keeping means that keeps the association information; check means that, when the reception means receives the message, refers to the association information kept by the association information keeping means so as to check whether the association information includes association information of the first interface or not; first information keeping control means that, if the check means understands that the association information of the first interface is not kept, makes the association information keeping means keep association information associating the first interface with the first edge device and a first domain managing device, while making the update instruction means instruct another domain managing device to update information similarly; inquiry means that, if the check means understands that the association information of the first interface is kept, makes an inquiry to a second domain managing device that manages a second edge device associated using association information of the first interface inquiring whether connection with the first interface of the mobile terminal is valid or not; and second information keeping control means that, as a result of the inquiry by the inquiry means, if the connection with the first interface is valid, makes the association information keeping means keep association information that associates the second interface with the second edge device and the second domain managing device in addition to association information that associates the first interface with the first edge device and the first domain managing device as association information common to the mobile terminal, while making the update instruction means instruct another domain managing device to update information similarly, and on the other hand as a result of the inquiry by the inquiry means, if the connection with the first interface is not valid, deletes the association information associating the second interface with the second edge device and the second domain managing device from the association information keeping means, while making the association information keeping means keep the association information associating the first interface with the first edge device and the first domain managing device, and further making the update instruction means instruct another domain managing device to update information similarly.

With this configuration, a node having a plurality of interfaces becomes capable of conducting connection of the plurality of interfaces simultaneously in a communication network domain (especially in a NetLMM domain). Further with this configuration, a configuration and an operation to identify a connection in units of interfaces in the third embodiment of the present invention described later can be implemented.

The above domain managing device of the present invention may be adapted to manage the association information while referring to policy of the mobile terminal.

This configuration enables registration of binding information and access control in accordance with policy corresponding to each mobile terminal.

The above domain managing device of the present invention may be adapted, when the policy of the mobile terminal specifies any one of that the mobile terminal does not conduct simultaneous connection of the plurality of interfaces, the mobile terminal has a single interface only, and only one of the plurality of interfaces is used, not to make an inquiry as to whether the mobile terminal tries to conduct simultaneous connection of the plurality of interfaces or not.

This configuration allows the domain managing device to judge promptly the case where an unnecessary inquiry (or a redundant inquiry) can be omitted.

To fulfill the above-stated object, an edge device of the present invention is adapted to conduct a protocol operation to implement local mobility of a mobile terminal having a plurality of interfaces on a network side, and can be disposed in a communication system including a mobility management domain formed therein, the edge device being disposed at an edge on a terminal side of an access network of the mobility management domain, with which the mobile terminal is connectable. The edge device includes: reception means that receives an inquiry from a domain managing device that manages a packet transfer path to the mobile terminal that connects with the mobility management domain, inquiring whether connection with a specific mobile terminal is valid or not; connection check means that checks whether the connection with the specific mobile terminal is valid or not; and notification means that notifies the domain managing device of a check result judged by the connection check means indicating whether the connection with the specific mobile terminal is valid or not.

With this configuration, a node having a plurality of interfaces becomes capable of conducting connection of the plurality of interfaces simultaneously in a communication network domain (especially in a NetLMM domain). Further with this configuration, a configuration and an operation in first through third embodiments of the present invention described later can be implemented.

To fulfill the above-stated object, an edge device of the present invention is adapted to conduct a protocol operation to implement local mobility of a mobile terminal having a plurality of interfaces on a network side, and can be disposed in a communication system including a mobility management domain formed therein, the edge device being disposed at an edge on a terminal side of an access network of the mobility management domain, with which the mobile terminal is connectable. The edge device includes: reception means that receives an inquiry from a domain managing device that manages a packet transfer path to the mobile terminal that connects with the mobility management domain, inquiring whether connection with a specific interface of a specific mobile terminal is valid or not; connection check means that checks whether the connection with the specific interface of the specific mobile terminal is valid or not; and notification means that notifies the domain managing device of a check result judged by the connection check means indicating whether the connection with the specific interface of the specific mobile terminal is valid or not.

With this configuration, a node having a plurality of interfaces becomes capable of conducting connection of the plurality of interfaces simultaneously in a communication network domain (especially in a NetLMM domain). Further with this configuration, a configuration and an operation in Embodiments 1 through 3 of the present invention described later can be implemented.

To fulfill the above-stated object, a mobile terminal of the present invention is adapted to conduct a protocol operation to implement local mobility of a mobile terminal having a plurality of interfaces on a network side, and is connectable with a communication system including a mobility management domain formed therein. The mobile terminal includes: a plurality of interfaces; simultaneous connection judgment means that judges whether there is a need to connect the plurality of interfaces with the mobility management domain simultaneously or not; and connection policy notification means that notifies, as connection policy, the mobility management domain of a judgment result obtained by the simultaneous connection judgment means as to whether the plurality of interfaces are to be connected simultaneously or not.

With this configuration, the mobile terminal can judge the necessity to connect the plurality of interfaces simultaneously, and can notify the mobility management domain of a result of the judgment as connection policy.

The above mobile terminal of the present invention may further include path optimization judgment means that judges whether an optimization path is to be used for communication with a correspondent node or not. The simultaneous connection judgment means judges necessity of simultaneous connection of the plurality of interfaces based on a judgment result by the path optimization judgment means.

With this configuration, the mobile terminal can judge the necessity to connect the plurality of interfaces simultaneously based on whether or not to use the optimization path, and can notify the mobility management domain of a result of the judgment as connection policy.

To fulfill the above-stated object, a mobile terminal of the present invention is adapted to conduct a protocol operation to implement local mobility of a mobile terminal having a plurality of interfaces on a network side, and is connectable with a communication system including a mobility management domain formed therein. The mobile terminal includes: a plurality of interfaces; and sending means that, when one of the plurality of interfaces connects with an edge device disposed at an edge on a terminal side of an access network of the mobility management domain, sends a location information updating message including identification information of the edge device to a location managing device existing on a home network of the mobile terminal, thus enabling notification to a domain managing device that manages a packet transfer path from the location managing device to the mobile terminal that connects with the mobility management domain, notifying that connection by the mobile terminal with the mobility management domains is conducted.

With this configuration, identification information on MAGs is added to a BU message sent to a home agent, for example, whereby the home agent can understand a MAG with which the mobile terminal connects, and the home agent can notify the LMA that the mobile terminal connects with the MAG in the mobility management domain.

The present invention includes the above-stated configuration, and therefore the present invention has the effect of enabling a node having a plurality of interfaces to conduct connection of the plurality of interfaces simultaneously in a communication network domain (especially in a NetLMM domain).

BEST MODE FOR CARRYING OUT THE INVENTION

The following describes embodiments of the present invention with reference to the drawings.

According to the present invention, a method is provided enabling a mobile node to connect a plurality of interfaces thereof in a communication network domain. Thereby, simultaneous connection by the mobile node can be implemented in the communication network domain.

In the present specification the term "NetLMM domain" refers to a communication network domain in which one or a plurality of mobile access gateways (MAG) and one or a plurality of local mobility anchors (LMA) connect with an access network, and a certain localized mobility management protocol is executed, thus enabling a mobility action by a mobile node connected therewith.

Further, in the present specification the term "multimode node" represents a node (a host or a router) having a plurality of selectable addresses (or prefixes). These addresses may be media access control (MAC) addresses or may be IPv4 or IPv6 addresses. The plurality of selectable addresses refer to the multimode node being capable of receiving one or a plurality of prefixes notified on a link and having a plurality of interfaces usable on the same link or on different links. The plurality of interfaces may be logical interfaces, and it is well known that one radio portion may be shared by a plurality of connection modes, while switching at a rate that can be ignored from the viewpoint of a network interface or maintaining a logical link at layer 2, thus configuring it to operate equivalently to the case of connecting with a network via a plurality of interfaces.

<First Embodiment>

Figure 1:
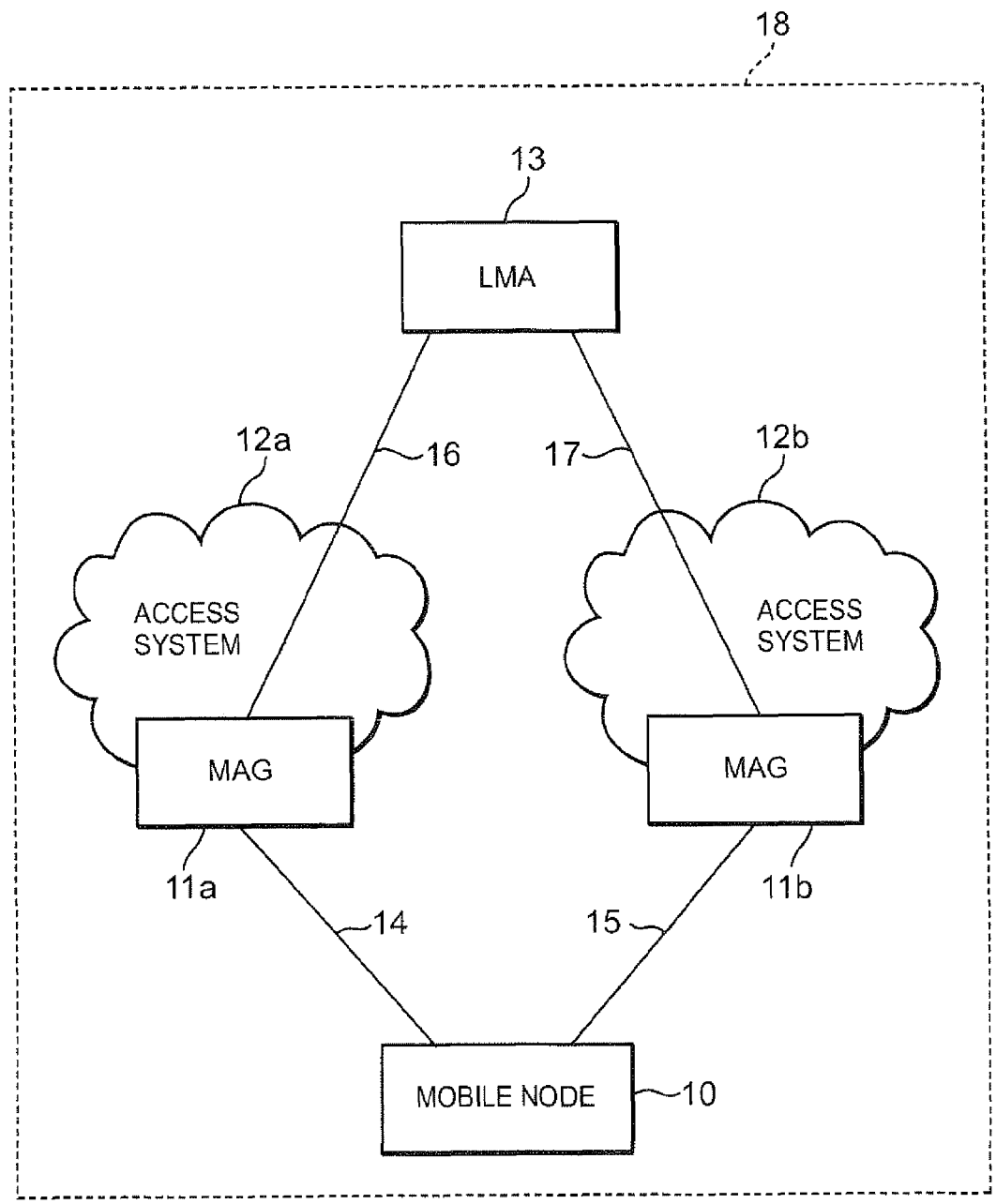
FIG. 1 illustrates an exemplary network topology (connection condition of a network) in the first embodiment of the present invention.

Firstly, the following describes the first embodiment of the present invention. FIG. 1 illustrates an exemplary network topology (connection condition of a network) in the first embodiment of the present invention. A network illustrated in FIG. 1 is a NetLMM domain 18, and the NetLMM domain 18 includes a mobile node (MN) 10, two mobile access gateways (MAG) 11a, 11b, two access systems 12a, 12b, and a local mobility anchor (LMA) 13.

In the network illustrated in FIG. 1, the MN 10 is a multimode node capable of connecting with a plurality of MAGs 11a, 11b so as to implement simultaneous connection in the NetLMM domain 18. When joining the NetLMM domain 18, the MN 10 connects with a MAG, so as to acquire the right to connect with the NetLMM domain 18. A method for the MN 10 to connect with the MAG includes a method using the technique specified by IEEE802.1x, for example, which is not a limiting example.

The MAG 11a and the MAG 11b illustrated in FIG. 1 are routers with which the MN 10 is connectable, and function as the first hop routers for the MN 10 in the NetLMM domain 18. Each MAG is connected with the mobile node via a specific link provided by a link layer. In the network illustrated in FIG. 1, the MN 10 connects with the MAG 11a via a link 14, and connects with the MAG 11b via a link 15.

The link layer technique used in this network includes the technique specified by IEEE802.11 or Bluetooth, which is not a limiting example. That is, even when another router actually exists between a MAG and a mobile node, an IP tunneling technique may be used to let the MAG function as the first hop router (with the IP tunnel functioning as a virtual link) for a specific connection (session). Each MAG has an identifier used for message exchange with the LMA in the NetLMM domain 18. Herein, the message exchange between the MAG and the LMA may be conducted using a signaling message, which is not a limiting example.

In the network illustrated in FIG. 1, the NetLMM domain 18 includes the two MAGs 11a, 11b and the access systems 12a, 12b. The NetLMM domain 18, however, may have a lot of (three or more) MAGs and access systems. FIG. 1 illustrates only one mobile node 10 connecting with the NetLMM domain 18. However, it is obvious for those skilled in the art that a plurality of mobile nodes 10 can connect with the NetLMM domain 18.

Each access system includes at least one MAG existing therein, with which the mobile node 10 is connectable, thus enabling access to the access system. In the network illustrated in FIG. 1, the MAG 11a exists in the access system 12a, and the MAG 11b exists in the access system 12b. The network technique used in the access systems 12a, 12b includes Wi-Fi, Bluetooth, or cellular technique, which is not a limiting example.

Each MAG sends an association request message including identification information (ID) of the MAG and a data transfer mode supported by the MAG (e.g., IPv6-in-IPv6), thus connecting with the LMA. Note here that FIG. 1 illustrates the state where the MAG 11a communicates with the LMA 13 via a link 16, and the MAG 11b communicates with the LMA 13 via a link 17.

In the network illustrated in FIG. 1, the LMA 13 is a router capable of keeping reachablity of the mobile node 10 to an address while the mobile node 10 moves in the NetLMM domain 18. The LMA 13 has a function of holding transfer information related to each mobile node existing in the NetLMM domain 18. The transfer information includes a set of mapping associating the mobile node with address information using an identifier (associating the mobile node with the MAG connecting with the mobile node), and a corresponding relationship between the LMA 13 and the MAGs in the NetLMM domain 18, which is not a limiting example.

When the LMA 13 receives the association request message from any MAG in the NetLMM domain 18, the LMA 13 establishes a connection with the MAG and returns an association request confirmation (acknowledgement) message as a response to the MAG. The association request confirmation message may include the ID of the LMA 13, and information such as consent to a data transfer mode to the above-stated MAG, which is not a limiting example.

When connecting with the NetLMM domain, the mobile node is first required to configure an address using a stateful address configuration or a stateless address configuration. Hereinafter this address configuration processing is called a MN address assignment processing. This MN address assignment processing is conducted by one or a plurality of LMAs that provide the connection to the NetLMM domain 18.

Referring now to the network illustrated in FIG. 1, the MN address assignment processing will be described below more clearly. Herein, assume that the MN 10 moves in the NetLMM domain 18, and detects the MAG 11a at a router solicitation phase thereof. The MN 10 conducts a connection processing with the MAG 11a, thus starting the MN address assignment processing. In order to register the existence of the MN 10 in the NetLMM domain 18, the MAG 11a sends a location registration message to the LMA 13. This location registration message may include the ID of the MAG 11a, and the ID of the MN 10, which is not a limiting example.

Subsequently, in the MN address assignment processing, the LMA 13 receiving the location registration message from the MAG 11a returns as a response a location registration confirmation message including a prefix (hereinafter this may be described as a NetLMM prefix) of the NetLMM domain 18 usable for the MAG 11a to notify the MN 10 of the router. This location registration confirmation message may include not only one NetLMM prefix but also a plurality of NetLMM prefixes.

When obtaining the NetLMM prefix, the MAG 11a subsequently sends the obtained NetLMM prefix to the MN 10 by router notification. The MN 10 preferably uses the NetLMM prefix to configure an address usable in the NetLMM domain 18. Hereinafter the address configured using the NetLMM prefix as a network prefix is called "NetLMM address" in the present specification.

When the MN 10 finishes configuring the NetLMM address by the stateful address configuration or the stateless address configuration, the MAG 11a sends a MN address setup message to the LMA 13, thus registering the NetLMM address of the MN 10 in the LMA 13. This MN address setup message may include the ID of the MAG 11a, the ID of the MN 10, and the NetLMM address of the MN 10, which is not a limiting example. The LMA 13 uses duplicate address detection (DAD) or the similar techniques, for example, to check uniqueness of the NetLMM address of the MN 10 in the NetLMM domain 18.

When it is found that the NetLMM address of the MN 10 is unique, the LMA 13 creates a transfer state concerning a packet of the MN 10, and sends a MN address setup reply message approving setup of the packet concerning the MN 10. Similarly, when the MAG 11a receives the MN address setup reply message notifying the approval, the MAG 11a further creates a transfer state concerning a packet addressed to the MN 10. This processing finishes the MN address assignment processing, thus allowing the MN 10 to send/receive a packet in the NetLMM domain 18.

The MN 10 is a multimode node, which can try to connect with the MAG 11b using a secondary interface of the MN 10 while connecting with the MAG 11a using a primary interface of the MN 10 as stated above in the network illustrated in FIG. 1. The MN 10 has a plurality of connections in the NetLMM domain 18, thus enabling execution of functions such as load balancing and filtering of a flow passing through a certain route. An actual application example includes the case where the MN 10 has two active flows (video flow and data flow). The MN 10 can connect with both of the MAGs 11a and 11b in the NetLMM domain 18, whereby the MN 10 can make a selection so that the video flow is transmitted via the MAG 11a and the data flow is transmitted via the MAG 11b. Thereby, the MN 10 can freely designate how the route of the flow is to be determined based on a flow type and access properties of the current network with which the MN 10 connects.

It is an object of the present invention to support a plurality of connections from a mobile node existing in the NetLMM domain 18 as stated above. To this end, in an embodiment of the present invention, when a LMA receives a location registration message including an ID of a MN already existing in a routing cache of its own from another new MAG (MAG different from the MAG set by the current transfer state), the LMA can make an inquiry to the MAG already connecting (the MAG set by the current transfer state). Such an inquiry allows the LMA to make an inquiry to the MAG already connecting whether the connection of the mobile node is still active or not.

In the case where simultaneous connection by the MN 10 is accepted in the NetLMM domain and the LMA receives, from a MAG, a location registration message with the ID of the MN 10 already existing in the routing cache of its own described therein, there are two possible situations as follows. The first case is where the mobile node tries to conduct simultaneous connections with the LMA in the NetLMM domain 18. The second case is where the mobile node moves from a MAG to another MAG, and tries to conduct a sequential connection (i.e., handover) in the NetLMM domain 18.

In order to let the LMA distinguish between the above-stated two cases, there is a need to judge which one of the simultaneous connection and the sequential connection is requested by the mobile node. In the present invention, the above-stated two cases are distinguished based on a response (query reply message) to an inquiry (query message) to the MAG already connecting.

In the case where the mobile node executes simultaneous connection with the LMA (the first case), the connection between the mobile node and the MAG receiving the inquiry is still in an active state. Thus, the MAG receiving the inquiry sends, to the LMA, a query reply message indicating that the connection of the mobile node is still active. On the other hand, in the case where the mobile node executes sequential connection to the LMA, the mobile node moves from the MAG receiving the inquiry to another MAG in the NetLMM domain 18, and therefore the connection between the mobile node and the MAG receiving the inquiry is already disconnected. Thus, the MAG receiving the inquiry sends, to the LMA, a query reply message indicating that the connection of the mobile node is not active.

The following describes a preferable method of implementing the simultaneous connection of the mobile node in the NetLMM domain. In this preferable method, the LMA 13 makes an inquiry to the MAG 11a using a message (hereinafter described as a heartbeat message) inquiring whether the connection between the MN 10 and the MAG 11a is valid or not, thus checking the connection state between the MN 10 and the MAG 11a.

For instance, the LMA 13 includes an effective entry concerning the MN 10 registered in the routing cache of the LMA 13, and when receiving a location registration request concerning the MN 10 from the MAG 11b, the LMA 13 sends a heartbeat message. Then, the LMA 13 receives a response message (hereinafter described as a heartbeat response message) in response to the heartbeat message from the MAG, and refers to information included in this heartbeat response message, thus judging if MN 10 is executing a simultaneous connection or a sequential connection (i.e., handover) in the NetLMM domain 18.

In this preferable method, the heartbeat message in the present invention (message inquiring whether the connection between the MN 10 and the MAG 11a is valid or not) can be implemented by expanding a heartbeat message (message sending to obtain a connection state of the other party between the LMA and the MAG) defined by Non-Patent Document 1.

Figure 2:
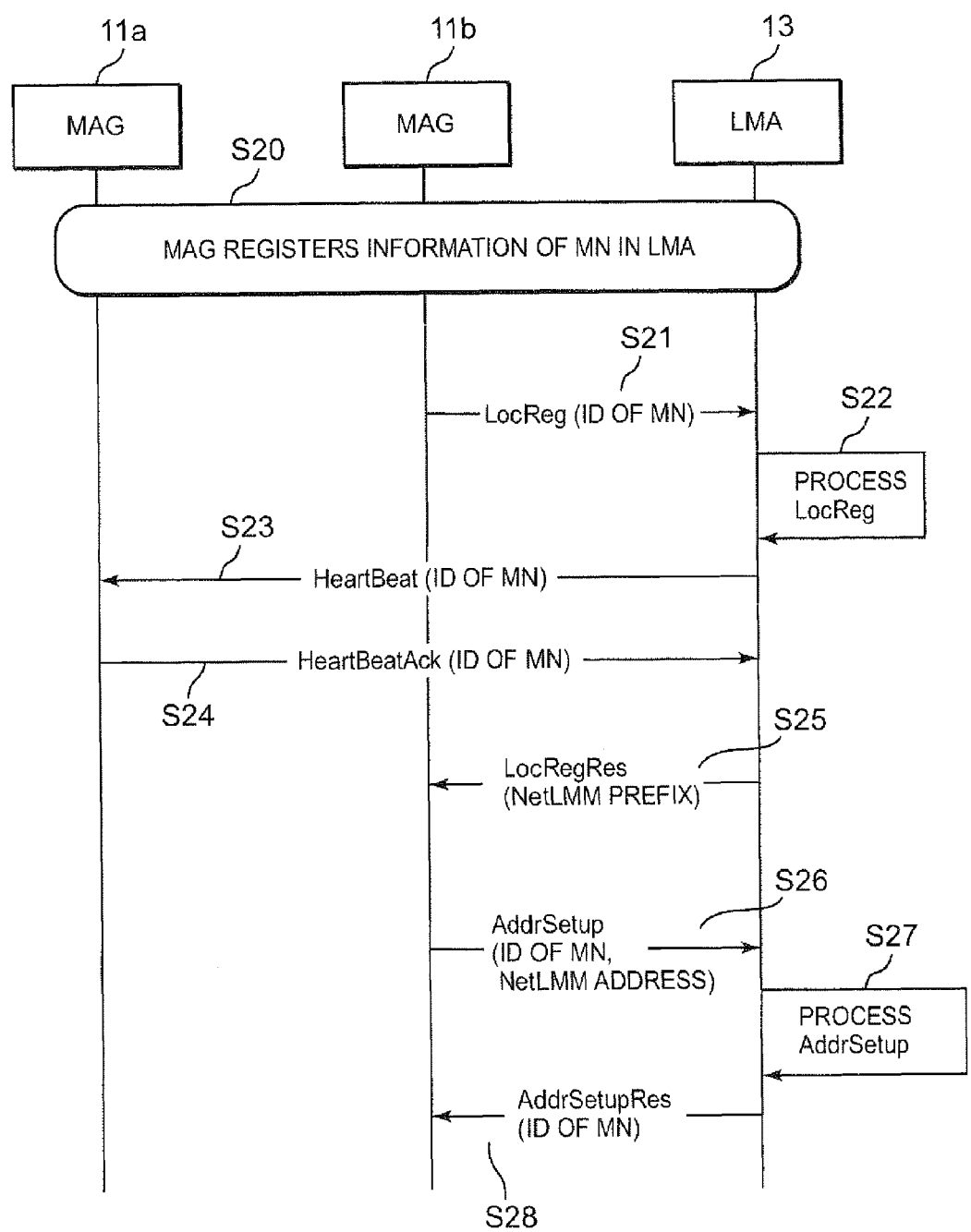
FIG. 2 is a sequence chart illustrating exemplary message exchange in the first embodiment of the present invention.

Referring now to FIG. 2, a preferable method of conducting simultaneous connection of the mobile node in the NetLMM domain will be described below. FIG. 2 illustrates exemplary message exchange in the first embodiment of the present invention. Herein, the MN 10 connects with the MAG 11a, whereby at Step S20 the MAG 11a starts to execute the MN address assignment processing concerning the MN 10 with respect to the LMA 13. Then, the MAG 11a registers the MN 10 in the LMA 13, resulting that the routing cache of the LMA 13 stores information on the MN 10. As the information on the MN 10, the ID of the MN 10 and the ID of the MAG 11a may be used, which are not a limiting one.

Herein, the MN 10 is a multimode node, and connects with the MAG 11b using a secondary interface so as to conduct a plurality of connections with the LMA 13 simultaneously. In order to register the connection of the MN 10 with the MAG 11b, the MAG 11b sends a location registration message (LocReg) to the LMA 13 at Step S21. The location registration message may include the ID of the MN 10, the ID of the MAG 11b, and the ID of the LMA 13, which is not a limiting example.

At Step S22, when receiving the location registration message from the MAG 11b and processing the same, the LMA 13 examines whether or not the ID of the MN 10 included in the received location registration message exists in the routing cache of its own or not, thus enabling to judge if the MN 10 is executing execute a simultaneous connection or a the sequential connection (i.e., handover). When the LMA 13 specifies that the ID of the MN 10 already exists in the routing cache of its own, the LMA 13 starts a processing to check if the MN 10 is executing a simultaneous connection or a sequential connection (i.e., handover). At Step S23, in order to specify whether the connection of the MN 10 with the MAG 11a is still active or not, an inquiry is made to the MAG 11a by sending a heartbeat message. The heartbeat message in the present invention may include the ID of the MN 10, the ID of the MAG 11a, and the ID of the LMA 13, which is not a limiting example.

Since the MN 10 tries to achieve the simultaneous connection in the NetLMM domain 18 through the MAG 11b, the current connection between the MN 10 and the MAG 11a is still active. When receiving the heartbeat message from the LMA 13, at Step S24 the MAG 11a sends, to the LMA 13, a heartbeat confirmation (acknowledgement) message (HeartBeatAck) as a query reply message indicating that the connection of the MN 10 is still active. This heartbeat confirmation message may include the ID of the MN 10, the ID of the MAG 11a, and the ID of the LMA 13, which is not a limiting example.

When receiving the heartbeat confirmation message from the MAG 11a, the LMA 13 understands that the MN 10 tries to establish simultaneous connection in the NetLMM domain 18. Thus, at Step S25 the LMA 13 sends, to the MAG 11b, a location registration confirmation message (LocRegRes) as a reply indicating that the location registration is normally conducted. This location registration confirmation message may include one or a plurality of NetLMM prefixes (NetLMM prefix used for router notification (router advertisement) sent from the MAG 11b to the MN 10), which is not a limiting one.

The MN 10 uses the NetLMM prefix in the router notification to configure an address (NetLMM address) usable in the NetLMM domain 18. The MAG 11b uses duplicate address detection (DAD), for example, to understand that the NetLMM address in the MN 10 is valid. Then, when the MAG 11b verifies that the NetLMM address of the MN 10 is unique, at Step S26 the MAG 11b sends a MN address setup message (AddrSetup) to the LMA 13, thus updating an entry concerning the MN 10 in the routing cache of the LMA 13. This MN address setup message may include the ID of the MAG 11b, the ID of the MN 10, and the NetLMM address of the MN 10, which is not a limiting one.

When receiving the MN address setup message, at Step S27 the LMA 13 processes this MN address setup message, and updates the entry concerning the MN 10 in the routing cache of its own so that both of the connection between the MN 10 and the MAG 11a and the connection between the MN 10 and the MAG 11b can be included. In the entry concerning the MN 10, the connection between the MN 10 and the MAG 11b is added to the connection between the MN 10 and the MAG 11a, thus allowing the LMA 13 to communicate with the MN 10 via a plurality of interfaces, whereby flow filtering of the MN 10 is executed, for example.

Then finally, at Step S28 the LMA 13 sends, to the MAG 11b, a MN address setup confirmation message (AddrSetupRes) notifying that the NetLMM address of the MN 10 is registered in the LMA 13. This MN address setup confirmation message may include the ID of the LMA 13 and the ID of the MN 10, which is not a limiting one.

In the above-stated operation, the LMA may use an interface ID (IF-ID) of the mobile node to make a judgment whether the mobile node tries to conduct simultaneous connection or the sequential connection (i.e., handover) in the NetLMM domain 18. In FIG. 2, the MAG 11a sends a first location registration message further including a first IF-ID (interface ID connecting with the MAG 11a) during the MN address assignment processing at Step S20. The LMA 13 updates the routing cache so that the first IF-ID of the MN 10 is further included in the entry concerning the MN 10. On the other hand, when the MN 10 connects with the MAG 11b, the MN 10 uses an interface identified by another interface ID (a second IF-ID). Thus, at Step S21 the MAG 11b sends, to the LMA 13, a second location registration message further including the second IF-ID of the MN 10.

When receiving the second location registration message from the MAG 11b, the LMA 13 processes the same at Step S22, thus finding that the first IF-ID of the MN 10 is different from the second IF-ID. Thus, the LMA 13 understands that the MN 10 tries to conduct simultaneous connection in the NetLMM domain 18. Then, the LMA 13 creates additional entry for the MN 10 in the routing cache of its own, thus keeping the connections using two different interface IDs simultaneously. In the case where the first and the second IF-ID of the MN 10 are the same at Step S22, the LMA 13 can understand that handover is conducted at the interface and process the same.

As stated above, the IF-ID is further used, whereby signaling message exchange between the LMA and the MAGs can be decreased while realizing effects similar to the above-stated operation without using IF-ID. Note that the IF-ID can be used, while conducing a query and a response using a heartbeat message and a heartbeat confirmation message.

<Second Embodiment>

The following describes the second embodiment of the present invention. The above-stated the first embodiment of the present invention describes the case where the present invention is applied to a network with only one LMA existing in the NetLMM domain. However, a plurality of LMAs may exist in the NetLMM domain, and further a mobile node may connect with a different LMA in the NetLMM domain.

Figure 3:
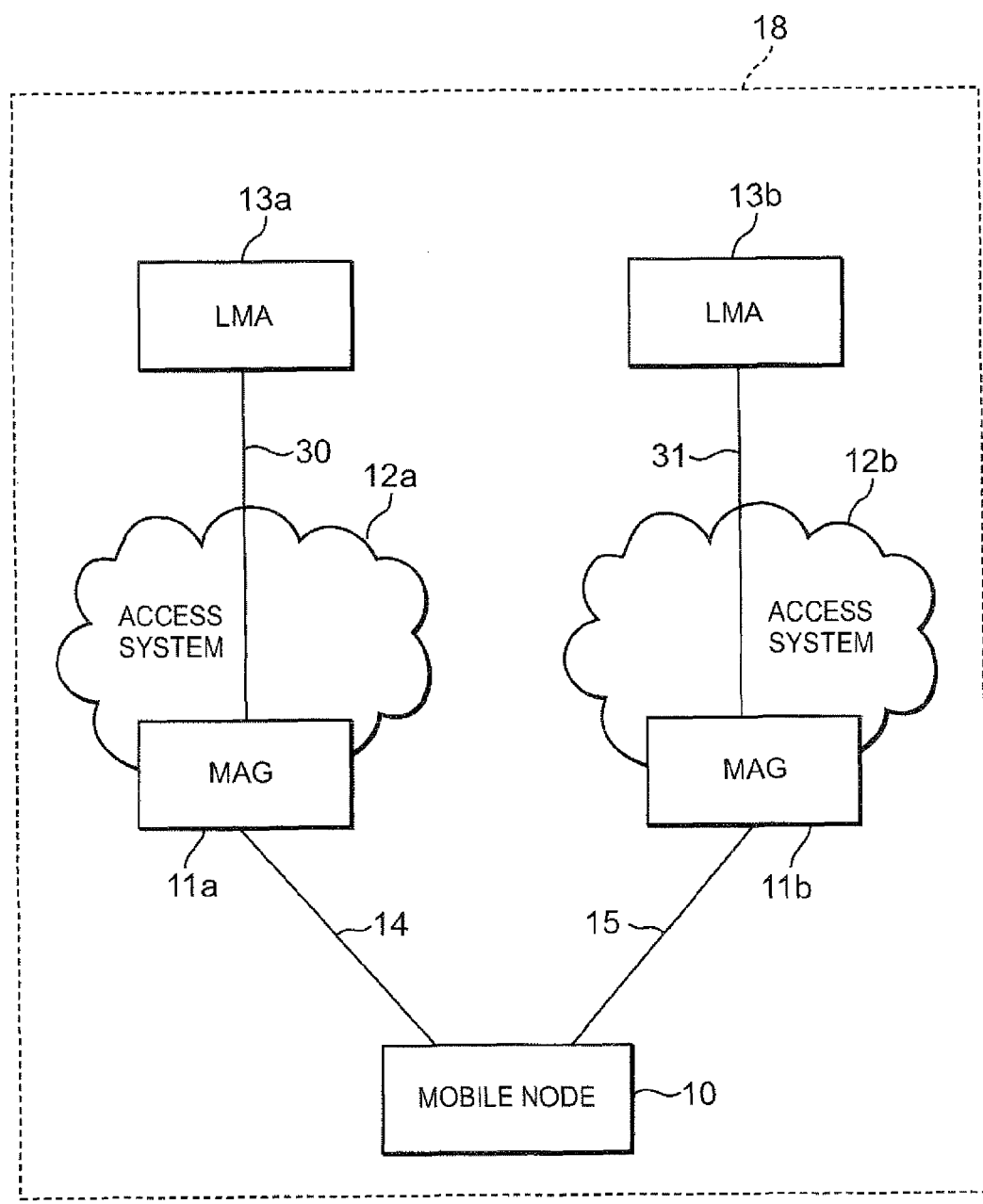
FIG. 3 illustrates an exemplary network topology (connection condition of a network) in the second embodiment of the present invention.

FIG. 3 illustrates an exemplary network topology (connection condition of a network) in the second embodiment of the present invention. A network illustrated in FIG. 3 is a NetLMM domain 18, and the NetLMM domain 18 includes a mobile node (MN) 10, two mobile access gateways (MAG) 11a, 11b, two access systems 12a, 12b, and two local mobility anchors (LMA) 13a, 13b.

In the network illustrated in FIG. 3, various elements of the NetLMM domain 18 are similar to those described with reference to FIG. 1. Meanwhile, the network illustrated in FIG. 3 is greatly different in that a plurality of LMAs are introduced in the NetLMM domain 18. Herein, the MAG 11a connects with the LMA 13a via a link 30, and the MAG 11b connects with the LMA 13b via a link 31. In the network illustrated in FIG. 3, the two LMAs 13a, 13b further exist in the NetLMM domain 18. More LMAs may exist in the NetLMM domain 18.

The Second embodiment of the present invention supports the case where simultaneous connection is conducted in the NetLMM domain with a plurality of LMAs existing therein as illustrated in FIG. 3. In the second embodiment of the present invention, in order to obtain information on a mobile node that tries to make a registration in the LMAs, the plurality of LMAs can make an inquiry to each other. As a result, the same object as that of the first embodiment as stated above can be achieved.

Figure 4:
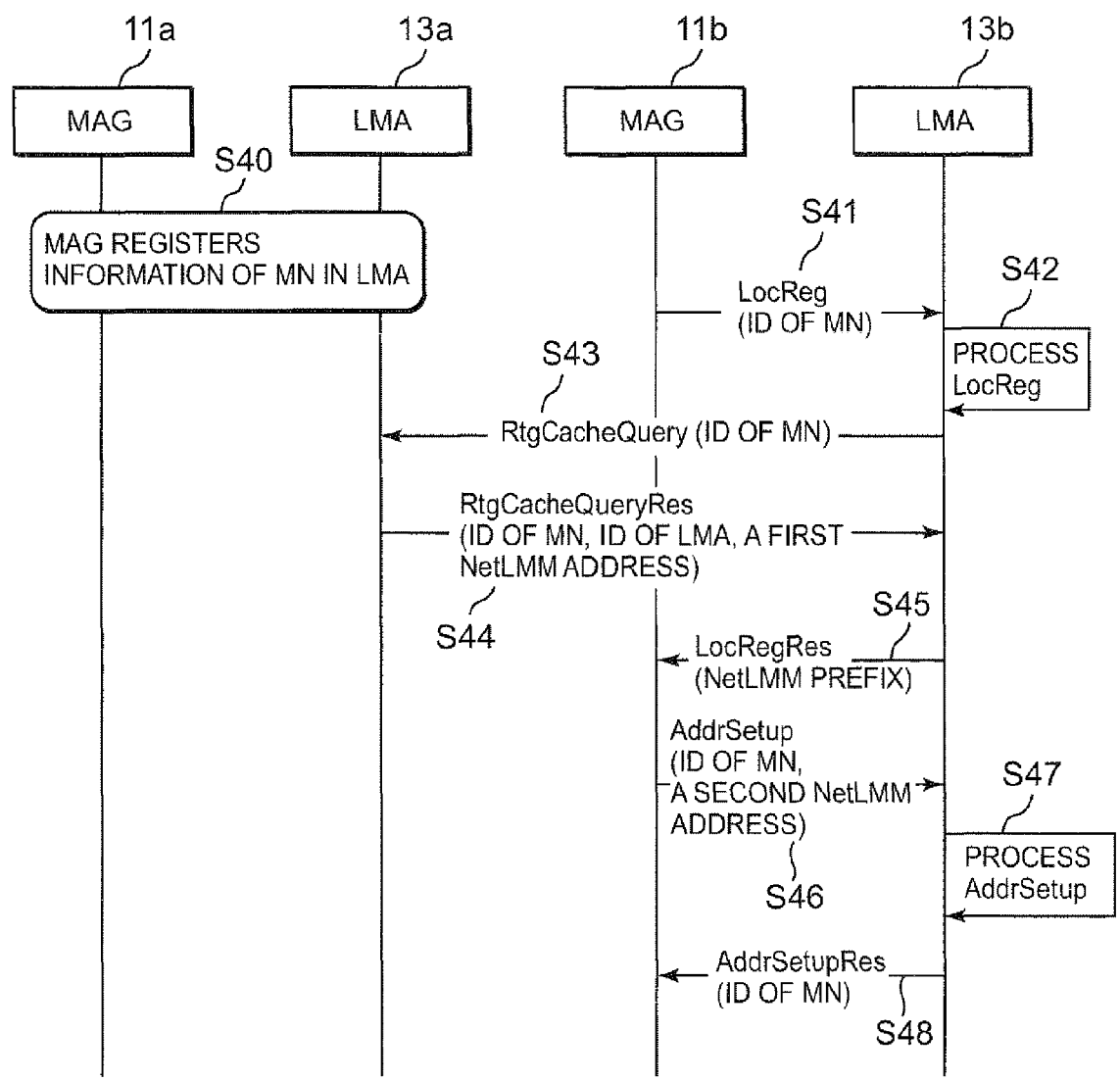
FIG. 4 is a sequence chart illustrating exemplary message exchange in the second embodiment of the present invention.

FIG. 4 illustrates exemplary message exchange in the second embodiment of the present invention. FIG. 4 illustrates a method when a mobile node executes simultaneous connection to a plurality of LMAs. In this preferable method, in order to check whether an existing entry concerning the MN 10 exists or not in another LMA in the NetLMM domain 18, the LMA 13b uses a routing cache query message to make an inquiry to another LMA (LMA 13a) in the NetLMM domain 18. The LMA 13b receives a registration request (location registration message) of the MN 10 from the MAG 11b, thus starting to send the routing cache query message. The LMA 13b uses the routing cache query message to judge if the MN 10 is executing a simultaneous connection or a sequential connection (i.e., handover) in the NetLMM domain 18. This preferable method allows the connection of the mobile node to be reduced to an exchange of a simple query response message between LMAs in the NetLMM domain 18.

In a sequence chart illustrated in FIG. 4, at Step S40, the MAG 11a registers information of the MN 10 with respect to the LMA 13a, so that the LMA 13a has an entry concerning the MN 10. Herein, in order to implement simultaneous connection in the NetLMM domain 18, connection with the MAG 11b is conducted at a secondary interface different from an interface connecting with the MAG 11a. In order to register the connection of the MN 10 with the MAG 11b, at Step S41 the MAG 11b sends a location registration message (LocReg) to the LMA 13b. This location registration message may include the ID of the MN 10, the ID of the MAG 11b and the ID of the LMA 13b, which is not a limiting example.

At Step S42, when receiving the location registration message from the MAG 11b and processing the same, the LMA 13a tries to examine which one of the simultaneous connection and the sequential connection (i.e., handover) the MN 10 tries to execute in the NetLMM domain 18. Then, at Step S43, the LMA 13b sends a routing cache query message (RtgCacheQuery) to another LMA (LMA 13a) in the NetLMM domain 18, and makes an inquiry whether an existing entry concerning the MN 10 exists or not in the routing cache of the LMA 13a. The routing cache query message may include the ID of the MN 10 and the ID of the LMA 13b, which is not a limiting one.

When receiving the routing cache query message sent at Step S42, the LMA 13a examines whether the entry concerning the MN 10 exists or not in the routing cache of its own, and specifies that the entry concerning the MN 10 is already included. Then, the LMA 13a sends the heartbeat message described in the first embodiment of the present invention as above to confirm a connection state between the MN 10 and the LMA 13a, and then responds to the query of the LMA 13b. In the case where the MN 10 tries to conduct a plurality of connections in the NetLMM domain 18, the LMA 13a understands that the connection with the MN 10 is active, and at Step S44 the LMA 13a sends a routing cache query response message (RtgCacheQueryRes) notifying the LMA 13b of including a valid existing entry concerning the MN 10. This routing cache query response message may include the ID of the LMA 13a, the ID of the MN 10, and the NetLMM address used for the connection of the MN 10 with the LMA 13a (a first NetLMM address), which is not a limiting one.

In the case where a LMA not including an entry concerning the MN 10 receives a routing cache query message, it is preferable to send a routing cache query response message as a reply indicating that no entry concerning the MN 10 exists. When the LMA 13a understands that connection with the MN 10 is not active as a result of the inquiry using the heartbeat message, it is preferable to send a routing cache query response message as a reply indicating such. The following mainly describes the case where the LMA 13a sends, to the LMA 13b, a routing cache query response message (Rtg-CacheQueryRes) as a reply notifying that a valid existing entry concerning the MN 10 is included.

When receiving the routing cache query response message from the LMA 13a, the LMA 13b receives a notification indicating that the MN 10 currently connects with the LMA 13a. Thus, the LMA 13b understands that the MN 10 tries to implement simultaneous connection in the NetLMM domain 18. Thereby, the LMA 13b stores the received information on the MN 10 in the routing cache, and at Step S45 the LMA 13b conducts a response processing using a location registration confirmation message (LocRegRes) with respect to the MAG 11b in order to make a notification of successful registration. This location registration confirmation message may include one or a plurality of NetLMM prefixes, which is not a limiting one. The MN 10 is notified of the one or the plurality of NetLMM prefixes by router notification sent from the MAG 11b.

The MN 10 uses a NetLMM prefix as the router notification to configure a usable address in the NetLMM domain 18. The MAG 11b uses a duplicate address detection (DAD) technique, for example, to judge whether the NetLMM address of the MN 10 is valid or not. After confirming that the NetLMM address of the MN 10 is unique, at Step S46 the MAG 11b sends a MN address setup message (AddrSetup) to the LMA 13b, thus updating an entry concerning the MN 10 in the routing cache of the LMA 13b. This MN address setup message may include the ID of the MAG 11b, the ID of the MN 10, and a second NetLMM address of the MN 10, which is not a limiting one. The first and the second NetLMM addresses of the MN 10 may be the same or may be different from each other.

When receiving the MN address setup message, at Step S47 the LMA 13b updates the entry concerning the MN 10 for the routing cache of its own so that both of the connection between the MAG 11a and the LMA 13a and the connection between the MAG 11b and the LMA 13b can be included. Then finally, at Step S48 the LMA 13b sends, to the MAG 11b, a MN address setup confirmation message (AddrSetupRes) notifying that the second NetLMM address of the MN 10 is registered in the LMA 13b. This MN address setup confirmation message may include the ID of the LMA 13b and the ID of the MN 10, which is not a limiting one.

On the other hand, in the case where the LMA 13b receives a routing cache query response message indicating the no entry concerning the MN 10 exists or a routing cache query response message indicating that the connection with the MN 10 is not active, it is considered that the MN 10 tries a first connection with respect to the NetLMM domain 18, or conducts sequential connection (handover), and the entry concerning the MN 10 for the routing cache of its own is updated so that only the connection between the MAG 11b and the LMA 13b is included, and then the processing as usual is conducted.

In the above-stated operation, the LMA may use an interface ID (IF-ID) of the mobile node to make a judgment whether the mobile node tries to conduct simultaneous connection or the sequential connection (i.e., handover) in the NetLMM domain 18. In FIG. 4, the MN 10 sends a first location registration message further including a first IF-ID (interface ID connecting with the MAG 1a) during the MN address assignment processing at Step S40, and the LMA 13a updates the routing cache so that the first IF-ID of the MN 10 is further included in the entry concerning the MN 10. On the other hand, when the MN 10 connects with the MAG 11b, the MN 10 uses an interface identified by another interface ID (a second IF-ID). Thus, at Step S41 the MAG 11b sends, to the LMA 13*b*, a second location registration message further including the second IF-ID of the MN 10.

Herein, when the routing cache query response message is sent from the LMA 13*a* to the LMA 13*b* as a reply at Step S44, the first IF-ID of the MN 10 is further included. As a result, the LMA 13*b* understands that the first and the second IF-IDs of the MN 10 are different, and understands that the MN 10 tries to implement simultaneous connection in the NetLMM domain 18. Then, the LMA 13*b* conducts a processing of creating an additional entry concerning the MN 10 in the routing cache of the LMA 13*b*. The usage of the IF-IDs in the second embodiment of the present invention can achieve effects similar to those obtained using the IF-IDs in the first embodiment of the present invention as stated above.

<Third Embodiment>

The following describes the third embodiment of the present invention. In the network configuration with a plurality of LMAs existing illustrated in FIG. 3, it can be configured that a LMA updates an entry in a cache of another LMA in a NetLMM domain. Herein, when a cache of a LMA is changed, the LMA sends a cache update message to another LMA in the NetLMM domain. A condition of changing a cache of a LMA includes connection or disconnection of a mobile node to a LMA, which is not a limiting one. Hereinafter, this cache update message is called a routing cache update message.

In the third embodiment of the present invention, a LMA making an inquiry refers to a routing cache, thus becoming capable of specifying whether the LMA holds information concerning the mobile node or not (i.e., capable of specifying a LMA holding information concerning the mobile node), whereby an inquiry can be made to a specific LMA holding information concerning the mobile node. Thereby, the signaling amount can be decreased when the LMA makes an inquiry of information concerning the mobile node in the NetLMM domain.

The following describes an operation of the third embodiment of the present invention. When a MN 10 succeeds in registration in a LMA 13*a* (a processing corresponding to Step S40 of FIG. 4), the LMA 13*a* sends, to a LMA 13*b*, a routing cache update message notifying of a new entry of the MN 10 in the LMA 13*a*. This routing cache update message may include the ID of the MN 10, the first IF-ID of the MN 10, the ID of the LMA 13*a*, and the NetLMM address of the MN 10, which is not a limiting example.

According to the information concerning the MN 10 in the routing cache update message received from the LMA 13*a*, the LMA 13*b* updates a routing cache of its own. The LMA 13*b* further may select so as to send, to the LMA 13*a*, a confirmation message notifying that the information sent to the LMA 13*b* is correctly received (and updated). For instance, the LMA 13*b* may send, to the LMA 13*a*, a routing cache update confirmation message indicating that the information concerning the MN 10 is successfully received. It is also possible for the LMA 13*b* not to respond to the LMA 13*a* as to whether the information concerning the MN 10 is successfully received or not.

In the case where the MN 10 tries to register a second NetLMM address in the LMA 13*b* through the MAG 11*b*, the LMA 13*b* refers to a routing cache of its own, and specifies that the ID of the MN 10 already exists in the NetLMM domain 18. Then, the LMA 13*b* makes an inquiry to a specific LMA (i.e., the LMA 13*a*) to judge if the MN 10 is executing a simultaneous connection or a sequential connection (i.e., handover) in the NetLMM domain 18. For instance, in the case where the MN 10 tries to implement simultaneous connection in the NetLMM domain 18, the LMA 13*a* sends, to the LMA 13*b*, as a reply that the connection between the MN 10 and the LMA 13*a* is still active. Thus, the LMA 13*b* conducts an update processing of the routing cache entry of its own so that an additional entry of the MN 10 is registered. Finally, the LMA 13*b* makes a notification concerning the updated entry of the MN 10, and updates a routing cache of another LMA in the NetLMM domain 18.

In the above-stated operation, the LMA 13*a* may use a routing cache update message to further send a first IF-ID of the MN 10 to the LMA 13*b*. When the MN 10 uses a second IF-ID to make a registration in the LMA 13*b*, the LMA 13*b* understands that the first IF-ID and the second IF-ID of the MN 10 are different, and the MN 10 tries to execute simultaneous connection in the NetLMM domain 18. The usage of the IF-IDs can achieve similar effects without using a query message inquiring if the MN 10 is executing a simultaneous connection or a sequential connection, and signaling further can be reduced between LMAs.

That is a description of the methods for allowing a mobile node to implement simultaneous connection in a NetLMM domain in the above-stated various embodiments. Simultaneous connection enables the existence of a plurality of routes to the mobile node in the NetLMM domain, thus allowing the mobile node to use a policy or a rule to determine the direction of the routing of the flow addressed to the mobile node itself. In the present specification, this method (redirection method) of determining the direction of the flow is called flow filtering, and a policy or a rule to determine this method is called a filter.

The mobile node can set these filters for LMAs in the NetLMM domain. Based on a routing cache in each LMA, the LMA maps a plurality of entries of the mobile node to the filters each being already defined. When the flow of the mobile node arrives at a LMA, the LMA checks the filter so as to decide a transferring method of a specific flow with respect to the mobile node. The following is a detailed description of a method to implement flow filtering concerning the mobile node.

In the network illustrated in FIG. 1 where one LMA 13 exists in the NetLMM domain 18, a filter concerning the MN 10 exists. At this time, a policy server (not illustrated) exists in the NetLMM domain 18, thus allowing the LMA 13 to make an inquiry to the policy server about various filters of the MN 10. For instance, when a flow (arrival flow) toward the MN 10 arrives at the LMA 13, the LMA 13 detects a plurality of entries concerning the MN 10 in the routing cache. In this case, the LMA 13 sends a query to the policy server, thus checking whether a filter set of the arrival flow concerning the MN 10 is included or not.

Herein, the MN 10 includes a filter set concerning this specific arrival flow in the NetLMM domain 18, and therefore the flow is transferred through the MAG 11*a*, for example. As stated above, the LMA 13 transfers the arrival flow of the MN 10 to the MAG 11*a*, and the LMA 13 transfers the arrival flow to the MN 10 one by one. Further, the LMA 13 can search for a filter of the MN 10 usable for flow filtering of a future flow of the MN 10, and can store the same in a routing cache of the LMA 13. The policy server and the LMA may be configured with the same entity.

On the other hand, in the case where the NetLMM domain includes a plurality of LMAs, flow filtering concerning the mobile node may be conducted in the NetLMM domain. In the network with a plurality of LMAs existing therein, a LMA understands existence of another LMA in the NetLMM domain, thus enabling the LMAs to mutually update information concerning the mobile node located in the NetLMM domain. Thereby, the LMAs in the NetLMM domain can understand whether the mobile node includes a plurality of connections or not.

FIG. 3 illustrates the state where the MAGs 11a and 11b connect with the LMAs 13a and 13b, respectively, in the NetLMM domain 18. Herein, a policy server exists in the NetLMM domain 18, thus allowing the LMAs 13a, 13b to make an inquiry about various filters concerning the MN 10 to the policy server. For instance, when the arrival flow of the MN 10 arrives at the LMA 13a, the LMA 13a detects from the routing cache of its own that the MN 10 has another active connection with the LMA 13b. Thus, In order to check whether the MN 10 has a filter set concerning the arrival flow or not, the LMA 13a sends a query to the policy server. Herein, since the MN 10 includes a filter set concerning this specific arrival flow in the NetLMM domain 18, the LMA 13a tunnels the arrival flow of the MN 10 to the LMA 13b, so that the flow passes through the MAG 11b for transmission.

When receiving the flow from the LMA 13a through the tunnel, the LMA 13b also sends a query to the policy server in order to check whether the MN 10 includes a filter concerning the arrival flow. Herein, the LMA 13b decides a filter among filters of the MN 10 so as to allow the flow to pass through the MAG 11b for transmission. As a result, the LMA 13b transfers the flow to the MAG 11b, and the MAG 11b transfers the flow to the MN 10. Further, the LMAs 13a, 13b can search for a filter of the MN 10 usable for flow filtering of a future flow of the MN 10, and can store the same in a routing cache of each of the LMAs 13a, 13b.

In the network illustrated in FIG. 3, each MAG may connect with a plurality of LMAs in the NetLMM domain 18. In this case, a policy server exists in the NetLMM domain 18, and the LMAs 13a, 13b can make an inquiry about various filters to the policy server. Since the MAG 11a further connects with the LMA 13b and the MAG 11b further connects with the LMA 13a, the LMAs 13a, 13b can directly transfer the flow concerning the MN 10 via any one of the MAGs 11a and 11b without establishing a tunnel between the LMAs in order to implement flow filtering. Thereby, an overlay network used when the flow concerning the mobile node is transferred in the NetLMM domain can be provided in the NetLMM domain.

In the above-stated embodiments, a LMA existing may be configured so as to search for a filter of a mobile node when receiving an arrival flow of the mobile node. With respect to such a LMA, the policy server may periodically update a filter of the mobile node existing in the NetLMM domain 18. When actually implementing, the policy server may multi-cast various filters concerning the NetLMM domain to the LMA at certain intervals. Thereby, the policy server can synchronize the filters stored in the respective LMAs.

In the NetLMM domain, the filters used by the LMAs to execute flow filtering may be defined using two entities. A first entity is a NetLMM service provider that manages the NetLMM domain. A second entity is a user of the mobile node.

For instance, in the above-stated the first embodiment of the present invention, the filter used for flow filtering may be defined by the NetLMM service provider. The NetLMM service provider uses the filter to control a method of using a resource in the NetLMM domain. For instance in FIG. 1, in the case where the NetLMM service provider detects that the MAG 11a is currently in an overload state, the NetLMM service provider sets a filter so as to instruct the LMA 13 to transfer any flow of the MN 10 via the MAG 11b. Thereby, the NetLMM service provider can execute load valance in the NetLMM domain 18.

The filter used for flow filtering may be defined by a user of the mobile node. Thereby, the user can freely select a method of transferring a certain flow to the mobile node. For instance, in the network illustrated in FIG. 3, assume that the user of the MN 10 downloads a massive video file through the MAG 11a, while conducting video call. In the case where the user of the MN 10 feels delay in the video call, the user decides to set a filter instructing the LMAs 13a, 13b so that the video call is provided via the MAG 11b. Thereby, when the LMA 13a or the LMA 13b receives the flow of the video call of the MN 10, the flow is transferred to the MAG 11b by each set filter. Thereby, the user can instruct a LMA concerning a transferring method of a flow sent to the MN 10.

As stated above, in the NetLMM domain 18, the NetLMM service provider or a user of the mobile node can set a filter. Herein, in the NetLMM domain 18, both of the NetLMM service provider and the user of the mobile node can set a filter.

The introduction of the policy server used in the present invention allows a filter to be stored and applied in the NetLMM domain. Some of the above-stated embodiments include the case where a policy server exists in the NetLMM domain 18. In the above-stated example, this policy server may be called a centralized policy server, and all filters of the NetLMM domain 18 can be recorded in this policy server. The introduction of the centralized policy server allows the NetLMM service provider or a user of the MN 10 to simply create or store a filter in the centralized policy server, thereby an advantage can be obtained, decreasing signaling as compared with the case where a plurality of LMAs existing in the NetLMM domain are updated. Further, the introduction of the centralized policy server leads to an advantage that a problem of failing to synchronize a plurality of LMAs hardly occurs.

In the NetLMM domain, a plurality of policy servers may exist. Thereby, it is possible to distribute means of processing a filter in the NetLMM domain. Herein, the NetLMM service provider or a user of the MN 10 creates a filter in each policy server in the NetLMM domain 18, and updates the same. Thereby, even when a trouble occurs in the policy server, a service such as flow filtering can be provided continuously in the NetLMM domain 18. Further, another policy server in the NetLMM domain 18 can function as a backup of the policy server generating the trouble.

In order to implement operations according to the above-stated various embodiments, a function (device) has to be introduced so as to allow a multimode node to implement simultaneous connection in the NetLMM domain. The following describes the case where a local mobility anchor (LMA) functions as a device to allow a multimode node to implement simultaneous connection in the NetLMM domain.

Figure 5:
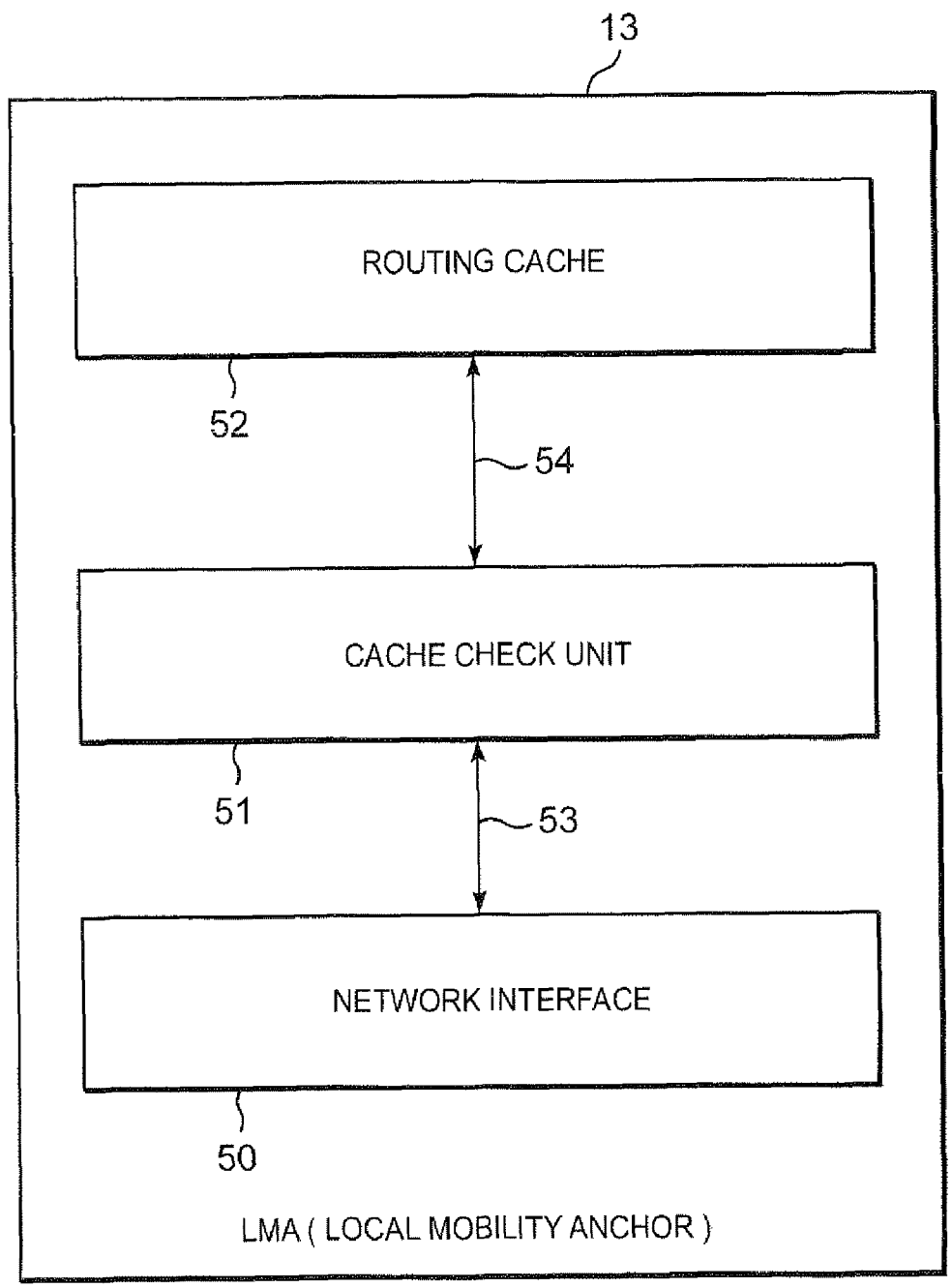
FIG. 5 illustrates an exemplary configuration of a LMA implementing an operation according to the present invention.

FIG. 5 illustrates an exemplary configuration of a LMA implementing an operation according to the present invention. A LMA 13 illustrated in FIG. 5 includes one or a plurality of network interfaces 50, a cache check unit 51, and a routing cache 52. The network interface 50 is a functional block including all hardware and software required to allow the LMA 13 to communicate with another node through any communication medium. Using terms known as those skilled in the art, the network interface 50 represents a communication component of a layer 1 (physical layer) and a layer 2 (data link layer), firmware, a driver, and a communication protocol. Herein, the LMA 13 can include one or more network interfaces 50.

The routing cache 52 includes an entry concerning any multimode node connected with the LMA 13. If possible, the routing cache 52 includes a list of multimode node entry, and each entry preferably includes an identifier unique to the multimode node in the NetLMM domain (further, may include an identifier identifying each interface of the multimode node). Further it is preferable that each entry describes a relationship between a LMA and one or a plurality of MAGs in the NetLMM domain. An entry in the routing cache 52 is updated or extracted via a signal/data path 54, whereby an operation by the cache check unit 51 can be assisted.

In the present invention, the cache check unit 51 is introduced. This cache check unit 51 is a functional block representing a function of algorithm used by the LMA 13, and this algorithm enables implementation of simultaneous connection with the LMA 13. Herein, the cache check unit 51 can start to operate when the LMA 13 receives a registration request (location registration message) in association with the multimode node in the NetLMM domain 18 as a trigger, which is not a limiting trigger.

The cache check unit 51 can process the location registration message, and execute a process of judging whether the entry of the multimode node already exists in the NetLMM domain 18 or not (whether the multimode node is executing a simultaneous connection or a sequential connection (i.e., handover) in the NetLMM domain 18). The cache check unit 51 further can execute a process of checking if the multimode node tries to execute a simultaneous connection or a sequential connection (i.e., handover) in the NetLMM domain 18. When the entry of the multimode node already exists in the routing cache 52, the cache check unit 51 executes a method of allowing the multimode node to implement simultaneous connection with the LMA 13 as stated above, for example. Herein, the cache check unit 51 can execute any one or a plurality of the methods in the above-stated various embodiments. The cache check unit 51 can receive a packet at an appropriate network interface 50 via the signal/data path 53, and send a packet from an appropriate network interface 50.

Figure 6:
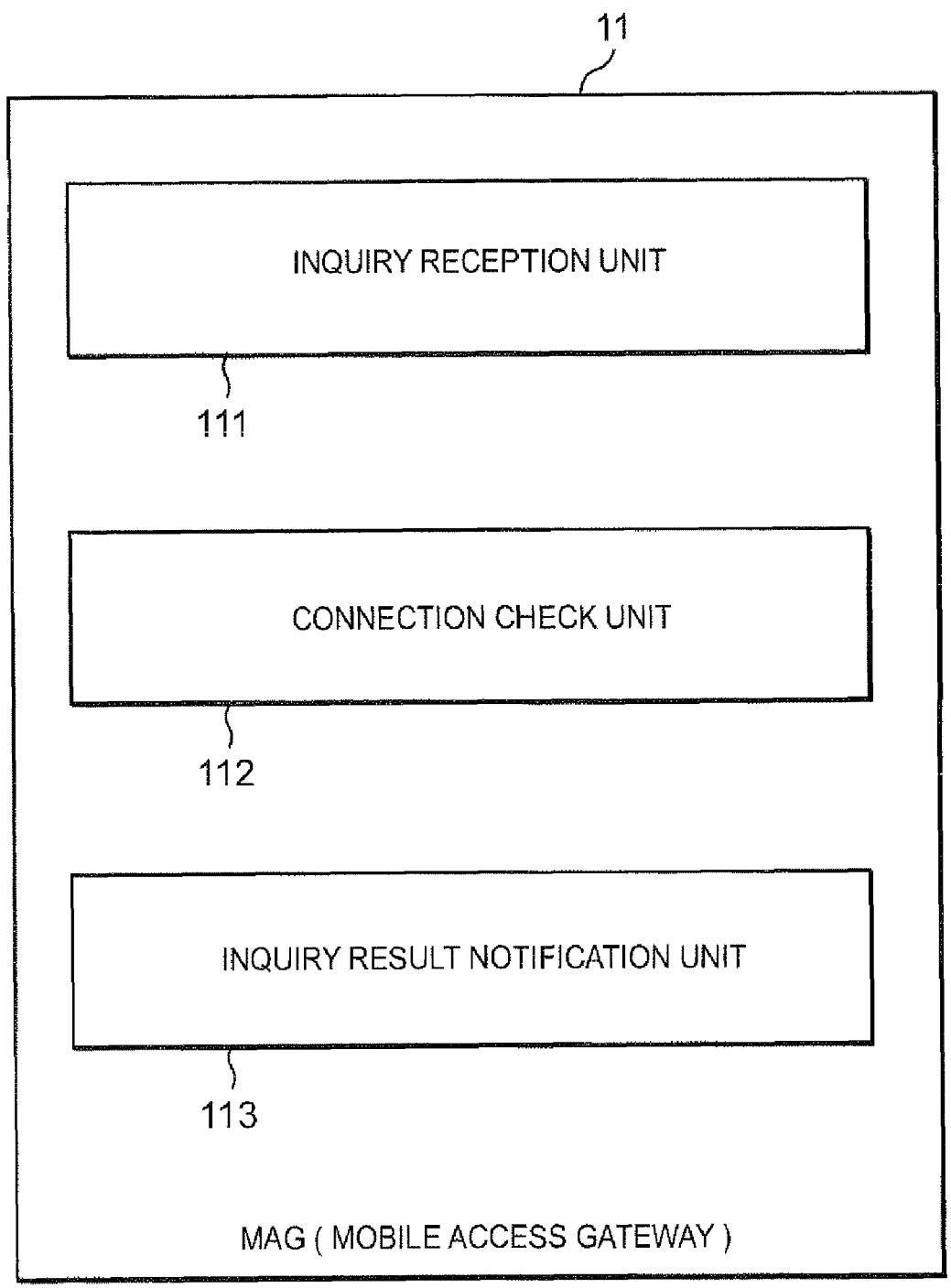
FIG. 6 is a functional block diagram representing exemplary functions of a MAG to implement an operation according to the present invention.

FIG. 6 is a functional block diagram schematically illustrating functions of a MAG to implement an operation according to the present invention. A MAG 11 illustrated in FIG. 6 includes an inquiry reception unit 111 that receives an inquiry from a LMA managing a packet transfer path to a multimode node connected with the NetLMM domain 18, inquiring whether connection with a certain multimode node is valid or not, a connection check unit 112 that checks whether a connection with a certain multimode node is valid or not, and an inquiry result notification unit 113 that notifies the LMA making the inquiry of a check result indicating whether the connection with a certain multimode node is valid or not. In a possible configuration, an inquiry may be received inquiring whether connection for a certain interface of a certain multimode node is valid or not, the connection may be checked, and a result of the check may be returned.

<Fourth Embodiment>

The following describes the fourth embodiment of the present invention.

The above-stated policy server described in the third embodiment of the present invention may be a local server (LS) as described in Non-Patent Document 4. In this case, as described in Non-Patent Document 4, the policy server can execute necessary signaling such as sending of a profile of the mobile node to a MAG, for example.

In the case where a PMIP (proxy mobile IP) is implemented in a NetLMM domain 18, a LMA sends a message inquiring whether connection with the mobile node is active or not, so that a method of judging whether the connection with the mobile node is still active or not (hereinafter called a query method) can be used.

Figure 7:
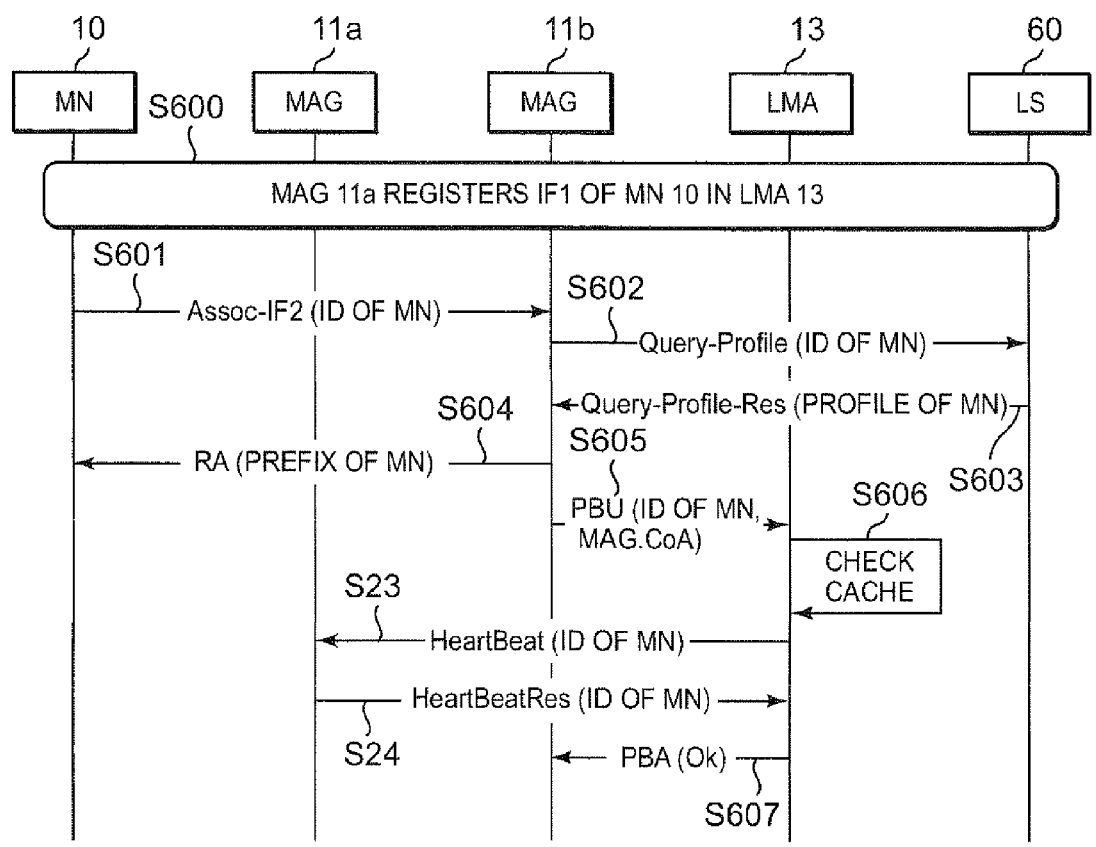
FIG. 7 is a sequence chart to describe the usage of a query method when PMIP is implemented in a NetLMM in the fourth embodiment of the present invention.

FIG. 7 is a sequence chart to describe the usage of the query method when the PMIP is implemented in the NetLMM in the fourth embodiment of the present invention. Herein, assume that the network topology illustrated in FIG. 1 is basically supposed, a PMIP is further implemented in the NetLMM domain 18, and a local server (LS) exists.

In FIG. 7, at Step S600, assume that a first interface (IF1) of a MN 10 connects with a MAG 11a in an active state, and a LMA 13 already has routing entry to the MN 10 via a MAG 11a. Herein, at Step S601, a second interface (IF2) of the MN 10 sends, to a MAG 11b, a connection message (Assoc-IF2) including an identifier of the MN (ID of the MN), thus trying to connect with the MAG 11b.

When receiving the ID of the MN, at Step S602 the MAG 11b sends a query profile message (Query-Profile) to search for the policy profile of the MN 10, thus making an inquiry to the LS 60 (Step S602). The LS 60 searches policy information in accordance with the ID of the MN, thus searching for the policy profile of the related MN 10. Then, when the policy profile of the MN 10 is found, at Step S603 the LS 60 sends, to the MAG 11b, a query profile response message (Query-Profile-Res) as a reply including the profile of the MN 10 (policy profile). The policy profile of the MN 10 includes a prefix (prefix of the MN) assigned to the MN 10, for example, which is not a limiting one.

When the MAG 11b receives the policy profile of the MN 10, the MAG 11b can conduct mobility management of the MN 10. Then, at Step S604 the MAG 11b sends a router advertisement message (RA) including the prefix of the MN 10 so as not to let a mobility management protocol operate in the MN 10. This processing allows the MN 10 to judge that the MN 10 still exists in the same network domain, so that the mobility management protocol is not executed in the MN 10.

At the same time, at Step S605 the MAG 11b sends a proxy binding update message (PBU) to the LMA 13, thus notifying the LMA 13 that the MN 10 currently connects with the MAG 11b. This PBU message includes the ID of the MN, and a care-of address of the MAG 11b (MAG.CoA), which is not a limiting example.

When receiving the PBU message from the MAG 11b, at Step S606 the LMA 13 checks the routing cache 52 to confirm whether the MN 10 has an active connection in the NetLMM domain. At this step, the LMA 13 finds that the MN 10 includes a routing entry via the MAG 11a.

In this case, at Step S23 the LMA 13 sends a heartbeat message (HeartBeat) inquiring whether the MN 10 still connects with the MAG 11a or not. This heartbeat message includes the MN ID of the MN 10, for example, which is not a limiting one.

When confirming that the MN 10 still connects with the MAG 11a itself, at Step S24 the MAG 11a sends a heartbeat response message (HeartBeatRes) as a reply to the LMA 13. This heartbeat response message includes the MN ID of the MN 10, which is not a limiting example.

When receiving the heartbeat response message, the LMA 13 understands that MN 10 tries to conduct simultaneous connection in the NetLMM domain. Thus, the LMA 13 creates a second routing entry (via the MAG 11b) for the MN 10 in the routing cache 52. Then, at Step S607 the LMA 13 sends, to the MAG 11b, a proxy binding acknowledgement (PBA) message notifying that binding of the MN 10 is conducted successfully.

In the operation illustrated in FIG. 7, a binding refresh method disclosed in Non-Patent Document 2 may be used to exchange a heartbeat message (inquiry/response).

For instance, at Step S606, when finding that the MN 10 already has a routing entry via the MAG 11a, the LMA 13 sends a proxy binding refresh request (proxy BRR) to the MAG 11a. Since the proxy BRR message includes the MN ID of the MN 10, this proxy BRR message notifies the MAG 11a that the LMA 13 wants to update a routing state of the MN 10.

When confirming that the MN 10 still connects with the MAG 11a, the MAG 11a responds with a PBU message, thus updating the routing state of the MN 10. Since the PMIP protocol reuses MIPv6 signaling for mobility management, thus leading to an advantage that the binding refresh method can be used while hardly changing the MAGs in the NetLMM domain.

At Step S601 of FIG. 7, the MN 10 may insert an interface identifier (ID of IF) in the connection message to the MAG 11b. The MN 10 uses the ID of the IF, thus enabling identification of the various interfaces for the MN 10. In this case, the PBU message sent from the MAG 11b to the LMA 13 at Step S605 further may include the ID of the IF of the MN 10 inserted therein. Thereby, when checking the routing cache 52 (Step S606), the LMA 13 may use the ID of the IF as additional information to judge whether the MN 10 tries to implement simultaneous connection or not in the NetLMM domain 18.

Since this method can lead to effects practically similar to those from exchange of a heartbeat message by checking of the ID of the IF, the exchange of the heartbeat message can be an optional operation. That is, the use of the ID of the IF can decrease processing load and network load caused by exchange of a signaling message between the LMA 13 and the MAG 11a.

The ID of the IF may be sent to the LS via a MAG. For instance, at Step S602 of FIG. 7, the ID of the IF of the MN 10 may be inserted in a query profile message sent from the MAG 11b to the LS 60. If the LS 60 is capable of having a function similar to that of the policy server in the NetLMM domain 18, the LS 60 can conduct an accounting processing of the MN 10 using the ID of the IF of the MN 10. In such an accounting processing, an amount billed for an owner of the MN 10 (service user) is calculated, for example.

In the case where a plurality of LMAs exist in the NetLMM domain 18, the LS 60 can make a response to a MAG concerning to one of which LMAs communication is to be conducted, in order to conduct binding according to a binding state of the mobile node. For instance, at Step S603 of FIG. 7, the query profile response message sent from the LS 60 to the MAG 11b further may include identification information of the LMA 13 as a target of the binding. Thereby, the MAG 11b can understand that a certain LMA 13 has to be found when processing mobility of the MN 10.

The LS 60 may store a filter policy that assists filtering of a traffic flow of the MN 10 in the NetLMM domain 18. This filter policy is configured by the mobile node, and is stored in the LS 60 by information exchange. The mobile node can send the filter policy to the LS 60 via a MAG, for example, or may send the politer policy directly to the LS 60.

When understating a filtering rule specified by the filter policy, the LS 60 can make a notification to a MAG about routing setting of the MN 10 in the NetLMM domain 18. For instance, at Step S603 of FIG. 7 the query profile response message sent from the LS 60 to the MAG 11b may further include the filter policy of the MN 10. Thereby, the PBU message sent at Step S605 may include the filter rule of the MN 10, for example, whereby the MAG 11b can set the filter rule of the MN 10 in the LMA 13. In this case, as a method of transferring the filter rule performed by the MAG 11b, the method described by the Monami6 working group of the IETF can be expanded for use by using the notification method of the present invention.

The LS 60 may hold connection setting (hereinafter called connection policy) of the mobile node in the NetLMM domain 18. The use of the connection policy of the mobile node allows a network entity in the NetLMM domain 18 to understand a connection type that can be implemented while the mobile node exists in the NetLMM domain 18.

For instance, assume that the connection policy of the mobile node indicates that the MN 10 is a mobile node having only one interface. The connection policy of the MN 10 indicates that the MN 10 can implement only single active connection in the NetLMM domain 18 in any case. The LS 60 can notify the LMA 13 of such connection policy of the MN 10. For instance, in the case where the MN 10 has an only single interface, the LMA 13 can understand that when processing the routing state of the MN 10 there is no need to conduct a query method with respect to the MN 10 as described in the above-stated respective embodiments. In this case, the LMA 13 understands that the MN 10 moves in the NetLMM domain 18 (conducts handover), and conducts a processing of overwriting an existing routing entry of the MN 10 concerning each received update.

Assume that connection policy of the MN 10 indicates that the MN 10 can conduct simultaneous connection in the NetLMM domain 18. In such a case also, the MN 10 may decide so as not to connect a plurality of interfaces in the NetLMM domain 18. One of the reasons to conduct such an operation includes the case where the WLAN interface of the NM 10 detects a free WLAN service in the neighborhood. At this time, a user may want to connect the WLAN interface of the MN 10 with an access point for a WLAN hotspot that is available at no charge, instead of paying for connection with the WLAN service in the NetLMM domain 18. Thus, in this case, there is a need to update the connection policy of the MN 10 so as to allow the network entity of the NetLMM domain 18 to understand that the MN 10 does not need to conduct simultaneous connection currently. Such update of the connection policy can be executed by the mobile node. For instance, in the case where the MN 10 does not conduct simultaneous connection, the LMA 13 can understand that there is no need to conduct a query method with respect to the MN 10 as described in the above-stated embodiments when processing the routing state of the MN 10. Such update of the connection policy is preferably conducted at any timing (or when registration information is updated) in accordance with a change in connection policy of the MN 10. For instance, during initial connection at the process of Step S600 of FIG. 7, the connection policy may be updated, and during connection a similar message is sent at any timing to notify of necessity/unnecessity of the following simultaneous connection (from the viewpoint of the NetLMM domain 18, necessity/unnecessity of exchange of a heartbeat message).

Another reason for the MN 10 not to conduct simultaneous connection of a plurality of interfaces in the NetLMM domain 18 includes that the MN 10 wants to have a path optimization session with a correspondent node. For instance, assume that the MN 10 has two interfaces, one of which is a cellular interface connected with the NetLMM domain 18, and the other of which is a WLAN interface that detects an access point in the NetLMM domain 18 existing in the neighborhood thereof.

At this time, the MN 10 can select to use a WLAN interface so as to establish the optimization path session with the correspondent node. This is effective for the case where the MN 10 does not want to transmit a packet from the correspondent node or a packet to the correspondent node in the NetLMM domain 18, for example, and the MN 10 may optimize a path with a correspondent node as described in Non-Patent Document 2.

In such a case, at Step S601 of FIG. 7 for instance (or at any timing prior to establishment of a path optimization session), a connection message sent from the MN 10 to the MAG 11b may further include a flag (nomadic flag). This nomadic flag allows the MN 10 to notify the MAG 11b that a PMIP service is unnecessary in the WLAN interface.

When the MAG 11b finds that the connection message includes the nomadic flag, the MAG 11b notifies the MN 10 of a local prefix of the MAG 11b instead of a prefix of the MN (Step S604). Thereby, the MN 10 can configure a care-of address that does not belong to the NetLMM domain 18 on the WLAN interface thereof, and the MN 10 can set up a path optimization session with the correspondent node using this care-of address. Herein, this path optimization session is not necessarily exclusive with respect to a normal session, and they may be mixed for use.

The MAG 11b may notify the LS 60 that the WLAN interface of the MN 10 connects with the MAG 11b but is in a nomadic mode. Thereby, the LS 60 can update the connection policy of the MN 10 and notify the LMA 13 of the connection state (connection policy) of the MN 10 in the NetLMM domain 18. This update allows the LMA 13 to understand that the MN 10 does not need to conduct simultaneous connection as described in the above-stated Embodiments.

The MAG 11b further can update the LMA 13 with respect to a connection state (connection policy) of the MN 10. This update indicates that the WLAN interface of the MN 10 connects with the MAG 11b but is in a nomadic mode. Thereby, the LMA 13 adds a nomadic flag to the routing entry, and the LMA 13 can understand by the nomadic flag existing in the routing entry that the MN 10 does not need to conduct simultaneous connection as described in the above-stated embodiments.

It is obvious that a method of updating a connection state by the mobile node in the present invention is different from the method described in Patent Document 3, for example. In the conventional technique described in Patent Document 3, a connection state of a mobile node in a network is defined or managed by a network operator. That is, processing is conducted by an entity in the network, which means that the mobile node does not need to update connection policy. On the other hand, in the update of the connection state of the present invention, the mobile node can modify the connection policy based on setting information (preference) thereof.

In FIG. 1, as a possible system, the LMA 13 further can have a function as a home agent of the MN 10 as well. In such a system, when the MN 10 moves outside of the NetLMM domain 18, the LMA 13 conducts a mobility binding processing (movement management) of the MN 10.

Herein, assume that the MN 10 connects the MAG 11a with the first interface via a path 14, and uses a home address (HoA) for the communication, and at the same time the MN 10 connects the MAG 11b with the second interface via a path 15 and uses a home care-of address (HCoA) for the communication. When the second interface of the MN 10 moves from the NetLMM domain 18 to a foreign network, the second interfaces obtains the care-of address (CoA). Thus, the MN 10 sends, to the LMA 13, a binding update (BU) message to bind the CoA with the HoA.

When receiving the BU message from the MN 10, the LMA 13 checks the routing cache 52, and confirms whether the MN 10 has an active connection (connection entry) in the NetLMM domain 18. In this example, the LMA 13 notices that the MN 10 has a routing entry via the MAG 11a. Then, the MN 10 queries the MAG 11a by the exchange of a heartbeat message so as to confirm whether the MN 10 still connects with the MAG 11a. Such exchange of a heartbeat message can prevent the LMA 13 from overwriting a routing state concerning the first interface of the MN 10 in the NetLMM domain 18. Thus, the MN 10 can achieve simultaneous connection with both of the NetLMM domain 18 and the foreign network.

In a system where the LMA 13 has a function as a home agent of the MN 10 as well, when one of the interfaces of the MN 10 returns to the NetLMM domain 18, it is possible to prevent the LMA 13 from deleting the routing entry using the exchange of a heartbeat message. For instance, assume that the MN 10 connects with the NetLMM domain 18 via the first interface, and the communication via the first interface uses the HoA. At the same time, assume that the MN 10 connects with a foreign network via the second interface, and the communication via the second interface uses the CoA. At the LMA 13, the CoA is bound with the HoA for packet transfer.

Herein, when the second interface of the MN 10 returns to the NetLMM domain 18 and tries to connect with the MAG 11b, the MN 10 sends a BU message to delete registration of the binding with the CoA at the LMA 13. The BU message is sent to the LMA 13 via the MAG 11b.

When receiving the BU message, the LMA 13 deletes all of the routing entries of the MN 10 by the method disclosed in Non-Patent Document 4, to create a temporary routing entry of the MN 10 via the MAG 11b. Thereby, the MN 10 will lose an active connection with the NetLMM domain 18 via the MAG 11a. However, the LMA 13 uses the query method by the exchange of a heartbeat message described in the present invention, so as to make an inquiry to the MAG 11a, thus understanding that the first interface of the MN 10 is still active.

As a result, the CoA binding of the MN 10 is simply deleted at the LMA 13, and the routing state of the MN 10 via the MAG 11a can be maintained. Thereby, the problem that the MN 10 loses an active connection (simultaneous connection) with the NetLMM domain 18 occurring when one of the interfaces of the MN 10 returns to the NetLMM domain 18 can be solved.

Further, in FIG. 1 a further possible system can be considered in which a home agent of the MN 10 exists. The home agent has a function (movement management function) that deals with a mobility binding processing of the MN 10 when the MN 10 moves outside of the NetLMM domain 18.

Herein, assume that the MN 10 connects the MAG 11a with the first interface via the path 14 and the communication uses a home address (HoA), and at the same time the MN 10 connects the MAG 11b with the second interface via the path 15, and the communication uses a care-of address (CoA). At the home agent, the CoA is bound with the HoA for packet transfer.

In such a system, the LMA 13 exists at a higher hierarchical level of the home agent in the NetLMM domain 18. This means that when a packet from a global internet arrives at the NetLMM domain 18, the packet firstly arrives at the LMA 13 and undergoes the processing.

In the case where the packet is addressed to a care-of address of the mobile node outside of the NetLMM domain 18, the LMA 13 transfers the packet to the home agent, so as to conduct routing of the packet to the mobile node. This means the existence of binding between the LMA 13 and the home agent of the MN 10.

For instance, when the MN 10 creates mobility binding at the home agent, the home agent notifies the LMA 13 that the MN 10 has a connection with the home agent (i.e., binding for packet transfer via the home agent is registered). Such an operation allows the home agent to have a function similar to a MAG of the NetLMM domain 18. The LMA 13 confirms information sent from the home agent, and configures routing gentry of the MN 10 reachable via the home agent. Then, the use of the filter rule allows the LMA 13 to understand a packet to be transferred to the MN 10 via the home agent.

In the case where the second interface of the MN 10 returns to the NetLMM domain 18 and tries to connect with the MAG 11*b*, the MN 10 sends BU to delete registration of the binding with the CoA at the home agent. In order to conduct a binding processing in the NetLMM domain 18 via the MAG 11*b* quickly, the MN 10 can add identification information of the MN 11*b* to the BU message. Thereby, the home agent can understand that the MN 10 tries to connect with the NetLMM domain 18 via the MAG 11*b*, and notify the LMA 13 that the MN 10 tries such a connection.

The LMA 13 makes an inquiry of the MAG 11*b* whether the MN 10 is active or not using the heartbeat message exchange. The operation by the LMA 13 to make an inquiry to the MAG so as to establish a routing entry of the mobile node is effective when the MAG is in an overload state. In such a case, the MAG delays sending of the PBU message, thereby delaying a time required for connection of the mobile node with the NetLMM domain.

In the system according to the present invention, a mobile IPv4 (MIPv4) protocol may be implemented. Foreign agent (FA) described in MIPv4 protocol has basically a function similar to that of the MAG described in the present invention. Therefore, it can be understood that by considering the operation conducted by the MAG as an operation conducted by the FA, the method of implementing the simultaneous connection according to the present invention is applicable to a system implementing MIPv4 as well. For instance, a mobile node of MIPv4 may connect with two foreign agents (FA1 and FA2). Each foreign agent sends an independent binding update message to a home agent of the mobile node. The home agent uses the method described in Embodiments of the present invention, thus distinguishing a state where the mobile node changes a connection point from a state where the mobile node connects with two connection points simultaneously.

In the present specification, a heartbeat message is exchanged individually so as to confirm each mobile node. However, heartbeat messages required to be confirmed at the same timing may be sent collectively, or heartbeat messages may be exchanged to a part or all of the routing entries at any necessary timing judged by the LMA. Thereby, as for not-active connection entries, the entries thereof can be deleted (nullified) beforehand, for example.

Figure 8:
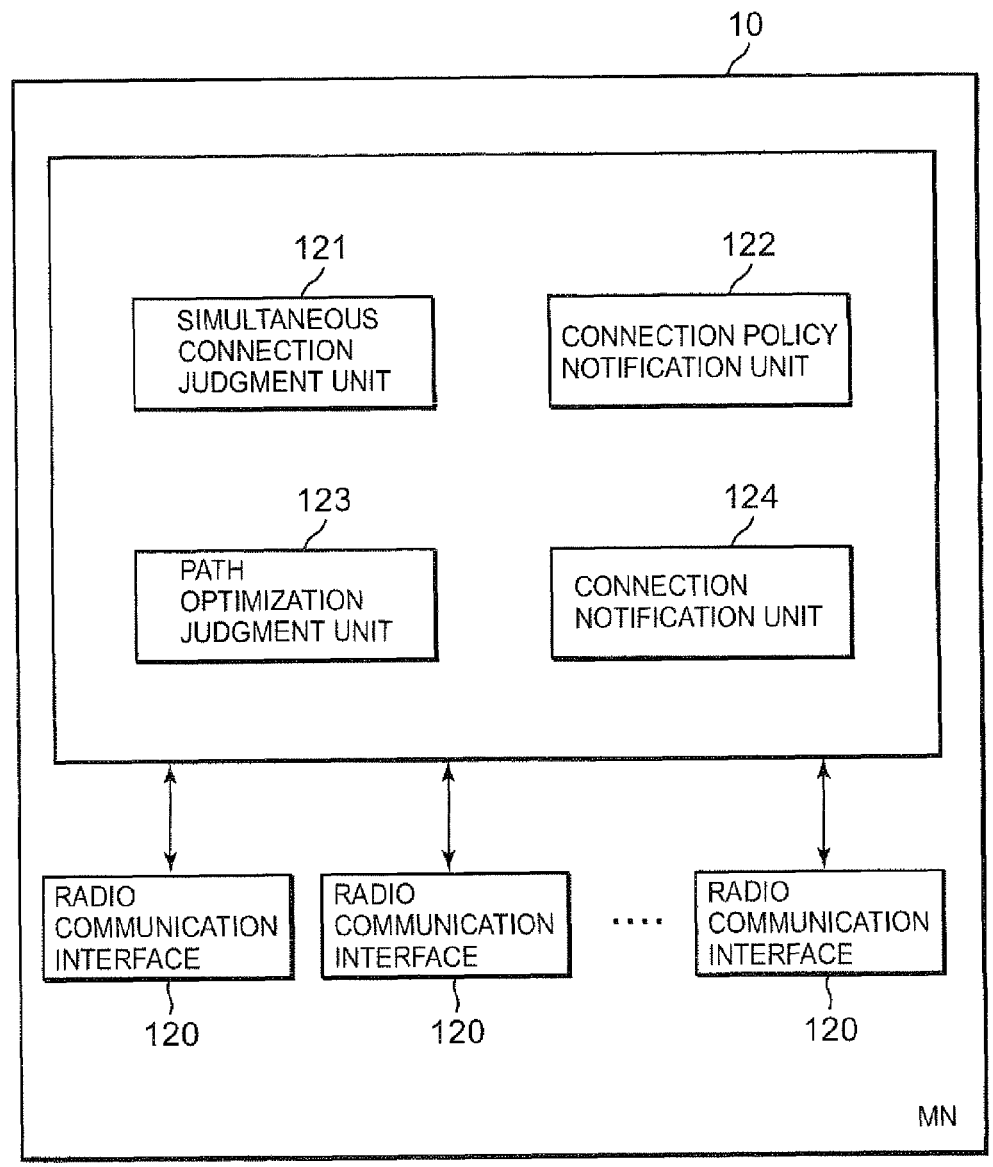
FIG. 8 is a functional block diagram representing exemplary functions of a MN to implement an operation according to the present invention.

The following describes a function of a MN so as to implement the operation according to the present invention. FIG. 8 is a functional block diagram representing exemplary functions of a MN to implement an operation according to the present invention. The MN 10 illustrated in FIG. 8 includes: a plurality of radio communication interfaces 120; a simultaneous connection judgment unit 121 that judges whether there is a need to connect the plurality of radio communication interfaces 120 simultaneously with the NetLMM domain 18 or not; a connection policy notification unit 122 that notifies the NetLMM domain 18 of a judgment result (necessity of the simultaneous connection of the plurality of interfaces) as connection policy judged by the simultaneous connection judgment unit 121; a path optimization judgment unit 123 that judges whether an optimization path is utilized or not for communication with a correspondent node as a communication party of the MN 10 and provides the judgment result to the simultaneous connection judgment unit 121 as a condition to judge the necessity of the simultaneous connection; and a connection notification unit 124 that sends, to a home agent of the MN 10 itself, a location information update message (a BU message may be used, for example) including identification information on a MAG thereof when connecting the MAG in the NetLMM domain 18 using any of the plurality of radio communication interfaces 120, thus allowing the home agent to notify the LMA in the NetLMM domain 18 that the MN 10 connects with the NetLMM domain 18.

Note here that the present specification illustrates and describes the present invention as the most practical and preferable embodiments. However, it is obvious for those skilled in the art that the present invention can be modified for design and parameters variously without departing from the scope of the present invention.

For instance, the present invention is applicable to a network where a plurality of LMAs exist in different NetLMM domains, respectively. In this case, it is preferable that the plurality of LMAs cooperate with each other.

Further, in the present invention, a LMA can manage a plurality of NetLMM prefixes, and a multimode node can use different NetLMM prefixes so as to configure a NetLMM address for each interface thereof. In this case, the LMA is required to check a prefix used by a multimode node in addition to an ID of a MAG so as to understand whether the multimode node conducts simultaneous connection in the NetLMM domain or not.

The present invention is further applicable to the case where a mobile node functions as a mobile router in a NetLMM domain.

The present specification describes as an exemplary localized mobility management protocol the case where a NetLMM domain (mobility management domain) is configured including a LMA of the NetLMM as a domain managing device and a MAG as an edge device. However, even in the case where a NetLMM domain is configured (is known as a ProxyMIP as well) including a local home agent as a domain managing device and a PMA (Proxy Mobile Agent) as an edge device, the present invention is applicable thereto simply by changing the respective detailed message exchange procedures and parameters. Further, obviously a foreign agent of mobile IPv4 may be configured as an edge device, to which the present invention is applicable.

The respective functional blocks used in the above description of embodiments of the present invention may be typically implemented as a LSI (Large Scale Integration) that is an integrated circuit. These blocks may be individually configured as one chip, or one chip may include a part or all of the functional blocks. LSIs may be called an IC (Integrated Circuit), a system LSI, a super LSI, and an ultra LSI depending on the degree of integration.

A technique for integrated circuit is not limited to LSI, but an integrated circuit may be achieved using a dedicated circuit or a general-purpose processor. After manufacturing a LSI, a FPGA (Field Programmable Gate Array) capable of programming and a reconfigurable processor capable of reconfiguring connection and setting of a circuit cell inside a LSI may be used.

Further, if a technique for integrated circuit that replaces LSIs becomes available by the development of a semiconductor technique or derived techniques, a functional block may be naturally integrated using such a technique. For instance, biotechnology may be applied thereto.

Industrial Applicability

The present invention has an effect of enabling a node with a plurality of interfaces to connect the plurality of interfaces simultaneously in a communication network domain (especially NetLMM domain), and is applicable to a technique in a packet-exchange type data communication network such as an IP network, a communication technique using a node having a plurality of interfaces, a communication technique using a localized mobility management protocol such as a NetLMM protocol and the like.

The invention claimed is:

1. A communication system configured to conduct a protocol operation to implement local mobility of a mobile terminal having a plurality of interfaces on a network side, and that includes a mobility management domain formed therein, the communication system comprising:
a plurality of edge devices disposed at an edge on a terminal side of an access network of the mobility management domain, with which the mobile terminal is connectable; and
a domain managing device that manages a packet transfer path to the mobile terminal that connects with the mobility management domain, and keeps association information that associates the mobile terminal with the edge device with which the mobile terminal currently connects,
wherein when the domain managing device receives from a first edge device a message notifying that the mobile terminal tries to connect with the first edge device, the domain managing device refers to the association information kept therein to check whether the association information includes association information of the mobile terminal that tries to the first edge device,
if the association information of the mobile terminal is included, the domain managing device makes an inquiry to a second edge device associated by the association information of the mobile terminal to inquire whether connection with the mobile terminal is valid or not,
if the connection with the mobile terminal is valid, the domain managing device keeps association information that associates the mobile terminal with both of the first edge device and the second edge device,
on the other hand, if the connection with the mobile terminal is not valid, the association information associating the mobile terminal with the second edge device is deleted, while keeping association information associating the mobile terminal with the first edge device.

2. The communication system according to claim 1, further comprising one or a plurality of policy servers that manage a filter for filtering a flow of the mobile terminal that is transferred in the access network.

3. The communication system according to claim 2, wherein when the mobile terminal uses a single interface, the domain managing device does not make an inquiry as to whether the mobile terminal tries to conduct simultaneous connection of the plurality of interfaces or not.

4. The communication system according to claim 2, further comprising a policy server that manages policy of the mobile terminal.

5. The communication system according to claim 1, wherein the domain managing device refers to policy of the mobile terminal and manages the association information.

6. The communication system according to claim 5, wherein when the policy of the mobile terminal specifies any one of that the mobile terminal does not conduct simultaneous connection of the plurality of interfaces, the mobile terminal has a single interface only, and only one of the plurality of interfaces is used, the domain managing device judges that the mobile terminal uses a single interface.

7. The communication system according to claim 1, wherein proxy-mobile IP is used as the protocol that implements the local mobility of the mobile terminal on the network side.

8. A communication system configured to conduct a protocol operation to implement local mobility of a mobile terminal having a plurality of interfaces on a network side, and that includes a mobility management domain formed therein, the communication system comprising:
a plurality of edge devices disposed at an edge on a terminal side of an access network of the mobility management domain, with which the mobile terminal is connectable; and
a domain managing device that manages a packet transfer path to the mobile terminal that connects with the mobility management domain, and keeps association information that associates the interface of the mobile terminal with the edge device with which the interface currently connects,
wherein when the domain managing device receives from a first edge device a message notifying that a first interface of the mobile terminal tries to connect with the first edge device, the domain managing device refers to the association information kept therein to check whether the association information includes association information of the mobile terminal that tries to the first edge device,
if association information associating a second edge device different from the first edge device with the first interface is included, the domain managing device deletes the association information associating the second edge device with the first interface, while keeping association information of the first edge device with the first interface,
if association information associating the second edge device with a second interface different from the first interface is included, the domain managing device keeps the association information associating the first edge device with the first interface in addition to the association information associating the second edge device with the second interface as association information common to the mobile terminal.

9. A domain managing device configured to conduct a protocol operation to implement local mobility of a mobile terminal having a plurality of interfaces on a network side, and that can be disposed in a communication system including a mobility management domain formed therein, the domain managing device managing a packet transfer path to the mobile terminal that connects with the mobility management domain, and keeping association information that associates the mobile terminal with an edge device with which the mobile terminal currently connects, the edge device being disposed at an edge on a terminal side of an access network of the mobility management domain, the domain managing device comprising:
a reception unit that receives from a first edge device a message notifying that the mobile terminal tries to connect with the first edge device;
an association information keeping unit that keeps the association information;
a check unit that, when the reception unit receives the message, refers to the association information kept by the association information keeping unit so as to check whether the association information includes association information of the mobile terminal that tries to connect with the first edge device or not;
an inquiry unit that, if the check unit understands that the association information of the mobile terminal is included, makes an inquiry to a second edge device associated using the association information of the mobile terminal to inquire whether connection with the mobile terminal is valid or not; and an information keeping control unit that, if it is judged as a result of the inquiry by the inquiry unit that the connection with the mobile terminal is valid, makes the association information keeping unit keep association information associating the mobile terminal with both of the first and the second edge devices, and if it is judged the connection with the mobile terminal is not valid, deletes association information associating the mobile terminal with the second edge device from the association information keeping unit, while making the association information keeping unit keep association information associating the mobile terminal with the first edge device.

10. The domain managing device according to claim 9, wherein the check unit is configured to manage the association information while referring to policy of the mobile terminal.

11. The domain managing device according to claim 10, wherein the inquiry unit is configured, when the policy of the mobile terminal specifies any one of that the mobile terminal does not conduct simultaneous connection of the plurality of interfaces, the mobile terminal has a single interface only, and only one of the plurality of interfaces is used, not to make an inquiry as to whether the mobile terminal tries to conduct simultaneous connection of the plurality of interfaces or not.

12. A domain managing device configured to conduct a protocol operation to implement local mobility of a mobile terminal having a plurality of interfaces on a network side, and that can be disposed in a communication system including a mobility management domain formed therein, the domain managing device managing a packet transfer path to the mobile terminal that connects with the mobility management domain, and keeping association information that associates interfaces of the mobile terminal with an edge device with which the interfaces currently connect, the edge device being disposed at an edge on a terminal side of an access network of the mobility management domain, the domain managing device comprising:

a reception unit that receives from a first edge device a message notifying that a first interface of the mobile terminal tries to connect with the first edge device;

an association information keeping unit that keeps the association information;

a check unit that, when the reception unit receives the message, refers to the association information kept by the association information keeping unit so as to check whether the association information includes association information of the mobile terminal that tries to connect with the first edge device or not; and an information keeping control unit that, if the check unit understands that association information that associates the first interface with a second edge device different from the first edge device is included, deletes association information associating the first interface with the second edge device from the association information keeping unit, while making the association information keeping unit keep association information associating the first interface with the first edge device, and if the check unit understands that association information that associates a second interface different from the first interface with the second edge device is included, makes the association information keeping unit keep the association information associating the first edge device with the first interface in addition to the association information associating the second edge device with the second interface as association information common to the mobile terminal.

* * * * *